US012634796B2

(12) United States Patent
Chen et al.

(10) Patent No.: US 12,634,796 B2
(45) Date of Patent: May 19, 2026

(54) DATA PROCESSING METHOD AND DEVICE

(71) Applicant: Guangzhou Jianyue Information Technology Co., Ltd, Guangzhou (CN)

(72) Inventors: Jiada Chen, Hangzhou (CN); Yun Deng, Hangzhou (CN)

(73) Assignee: Guangzhou Jianyue Information Technology Co., Ltd, Guangdong Province (CN)

( * ) Notice: Subject to any disclaimer, the term of this patent is extended or adjusted under 35 U.S.C. 154(b) by 440 days.

(21) Appl. No.: 17/952,069

(22) Filed: Sep. 23, 2022

(65) Prior Publication Data

US 2023/0082817 A1      Mar. 16, 2023

(30) Foreign Application Priority Data

Sep. 30, 2021      (CN) .......................... 202111174177.X

(51) Int. Cl.
*H04W 40/22*          (2009.01)
*H04L 45/00*          (2022.01)

(52) U.S. Cl.
CPC ............. *H04W 40/22* (2013.01); *H04L 45/20* (2013.01); *H04L 45/566* (2013.01)

(58) Field of Classification Search
CPC ...... H04W 40/22; H04L 45/20; H04L 45/566; H04L 67/10; A63F 13/35
See application file for complete search history.

(56) References Cited

U.S. PATENT DOCUMENTS

2023/0412516 A1* 12/2023 Wang .................... H04L 45/566

FOREIGN PATENT DOCUMENTS

| CN | 104580232 A | * | 4/2015 | ............. H04L 51/04 |
|---|---|---|---|---|
| CN | 104994534 A | * | 10/2015 | .......... H04L 1/0063 |
| CN | 107864084 A | * | 3/2018 | ............... H04L 1/18 |
| CN | 108667746 A | * | 10/2018 | ........ H04L 47/2433 |
| CN | 111246312 A | | 6/2020 | |
| CN | 115473890 A | * | 12/2022 | |
| WO | WO2020125647 A1 | | 6/2020 | |
| WO | WO-2022166464 A1 | * | 8/2022 | |

OTHER PUBLICATIONS

Machine translation of Third Examination Opinion Notice for related Chinese Application No. 202111174177.X, dated Jul. 29, 2025, 36 pages.

* cited by examiner

*Primary Examiner* — Umar Cheema
(74) *Attorney, Agent, or Firm* — Lee & Hayes, P.C.

(57)                ABSTRACT

A method including: determining whether the receiving terminal has received a second data packet when a first data packet in a plurality of data packets continuously sent by a sending terminal at an interval in a preset sending sequence is received, the second data packet comprises the data packet preceding the first data packet in the preset sending sequence; determining whether the second data packet is expired when the second data packet is not received; acquiring a consumption importance level of the second data packet when the second data packet is expired; and consuming the first data packet when the consumption importance level of the second data packet is a preset consumption importance level. Through the present disclosure, an application corresponding to the plurality of data packets is responded timely to avoid a delayed response to the applications. For example, the smoothness of the application is improved.

20 Claims, 10 Drawing Sheets

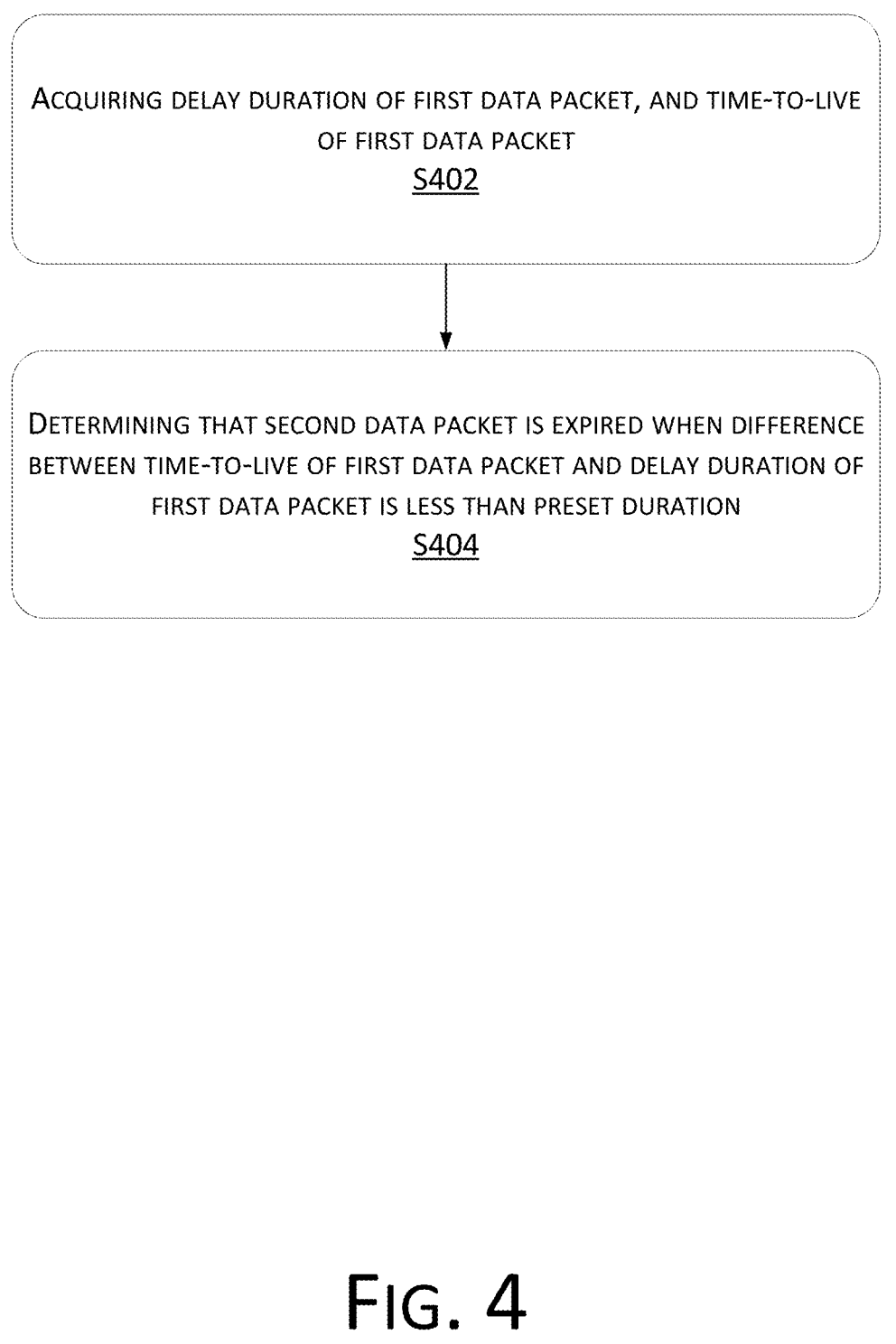

ACQUIRING DELAY DURATION OF FIRST DATA PACKET, AND TIME-TO-LIVE
OF FIRST DATA PACKET
S402

DETERMINING THAT SECOND DATA PACKET IS EXPIRED WHEN DIFFERENCE
BETWEEN TIME-TO-LIVE OF FIRST DATA PACKET AND DELAY DURATION OF
FIRST DATA PACKET IS LESS THAN PRESET DURATION
S404

FIG. 4

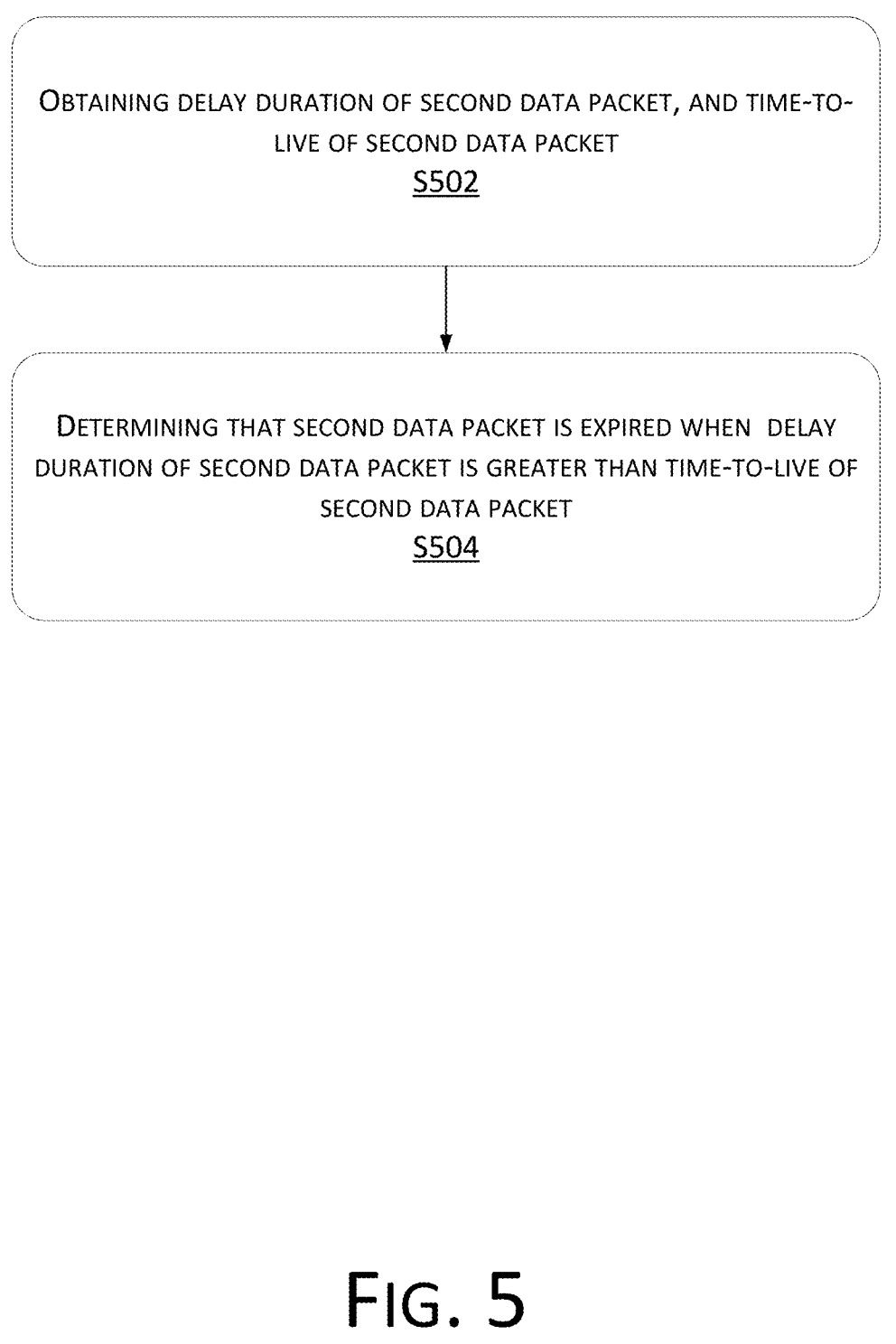

OBTAINING DELAY DURATION OF SECOND DATA PACKET, AND TIME-TO-LIVE OF SECOND DATA PACKET
S502

DETERMINING THAT SECOND DATA PACKET IS EXPIRED WHEN DELAY DURATION OF SECOND DATA PACKET IS GREATER THAN TIME-TO-LIVE OF SECOND DATA PACKET
S504

FIG. 5

Figure 6:
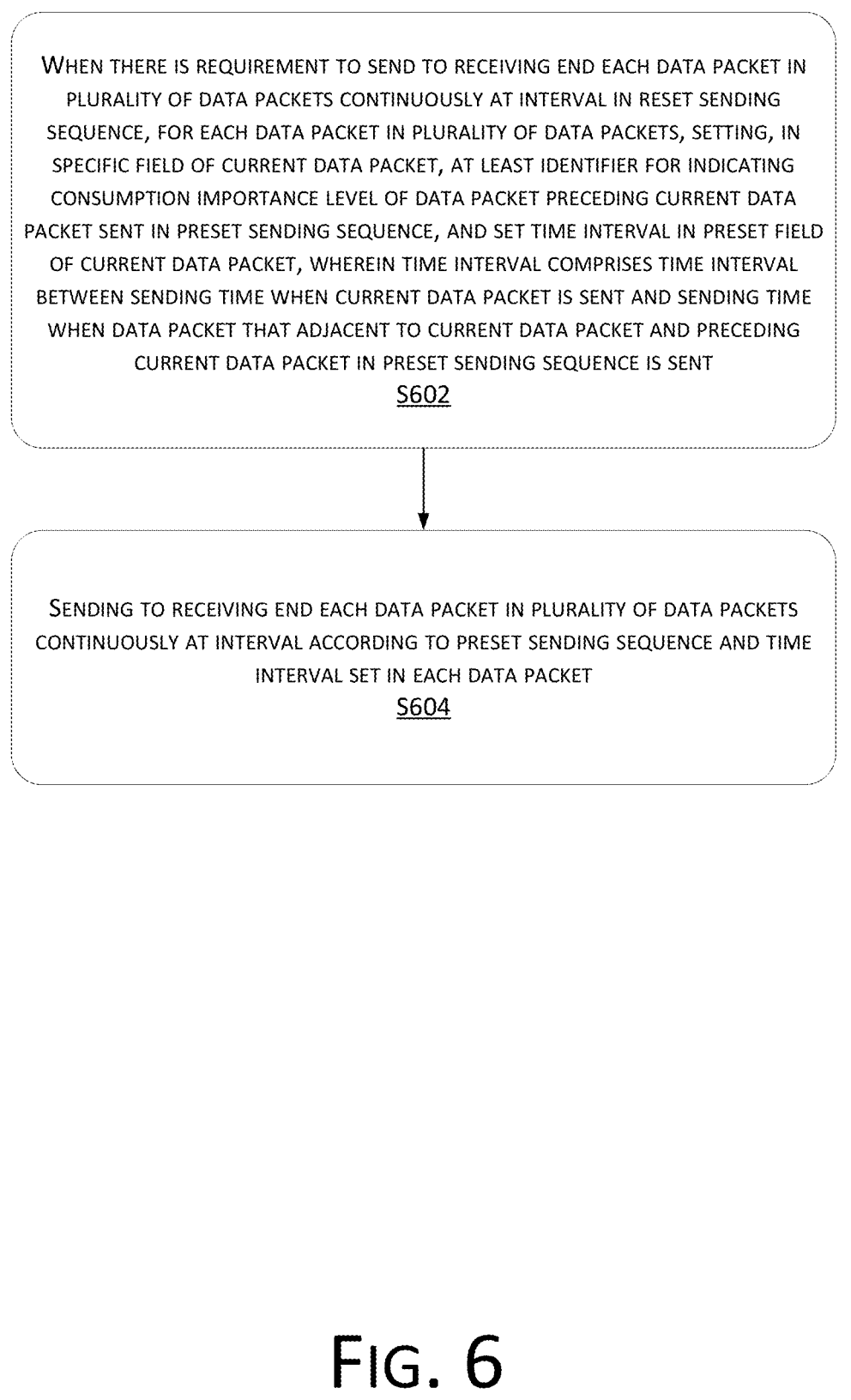

WHEN THERE IS REQUIREMENT TO SEND TO RECEIVING END EACH DATA PACKET IN PLURALITY OF DATA PACKETS CONTINUOUSLY AT INTERVAL IN RESET SENDING SEQUENCE, FOR EACH DATA PACKET IN PLURALITY OF DATA PACKETS, SETTING, IN SPECIFIC FIELD OF CURRENT DATA PACKET, AT LEAST IDENTIFIER FOR INDICATING CONSUMPTION IMPORTANCE LEVEL OF DATA PACKET PRECEDING CURRENT DATA PACKET SENT IN PRESET SENDING SEQUENCE, AND SET TIME INTERVAL IN PRESET FIELD OF CURRENT DATA PACKET, WHEREIN TIME INTERVAL COMPRISES TIME INTERVAL BETWEEN SENDING TIME WHEN CURRENT DATA PACKET IS SENT AND SENDING TIME WHEN DATA PACKET THAT ADJACENT TO CURRENT DATA PACKET AND PRECEDING CURRENT DATA PACKET IN PRESET SENDING SEQUENCE IS SENT

S602

SENDING TO RECEIVING END EACH DATA PACKET IN PLURALITY OF DATA PACKETS CONTINUOUSLY AT INTERVAL ACCORDING TO PRESET SENDING SEQUENCE AND TIME INTERVAL SET IN EACH DATA PACKET

DATA PROCESSING METHOD AND DEVICE

CROSS REFERENCE TO RELATED APPLICATIONS

This application claims priority to and is a continuation of Chinese Patent Application No. 202111174177.X, filed on 30 Sep. 2021 and entitled "DATA PROCESSING METHOD AND DEVICE," which is incorporated herein by reference in its entirety.

TECHNICAL FIELD

The present disclosure relates to the field of computer technologies, and, more particularly, to data processing methods and devices.

BACKGROUND

Cloud technology in combination with cloud virtualization technology and streaming media coding and transmission technology utilizes more and more improved cloud infrastructures and mobile communication networks to make games that could originally only be experienced with high-configuration/high-resource hosts more accessible.

During cloud gaming, a user plays a game on a mobile phone (such as tapping the screen or sliding the screen). A cloud game play instruction needs to be quickly and accurately transmitted to the cloud in order to quickly respond to the game screen.

For better game experience, the end-to-end latency of the cloud game play instruction must be controlled within a short time, such as 100 ms, to ensure the smoothness of the game.

The cloud game play instruction comprises a plurality of data packets, and the plurality of data packets have a preset sending sequence. That is, the mobile phone sequentially sends the plurality of data packets in the cloud game play instruction to the cloud at an interval in the preset sending sequence. Accordingly, the cloud also receives the plurality of data packets in turn and then consumes the plurality of data packets according to the consumption sequence matching with the preset sending sequence, so as to complete the response to the cloud game play instruction.

However, sometimes part of the plurality of data packets are lost during transmission, such that the cloud cannot receive this part of the plurality of data packets. In this way, data packets locate after this part of the plurality of data packets in the preset sending sequence may be not consumed even if they are received, but may be consumed until this part of the plurality of data packets are received and consumed.

However, in the process of waiting for this part of data packets, this part of data packets and the data packets located after this part of data packets in the preset sending sequence may be both delayed, for example, over 100 ms, resulting in that the instruction cannot be responded to in time, thereby affecting the smoothness of the game.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In order to solve the above technical problem, the present disclosure shows a data processing method and device.

In an example embodiment, the present disclosure shows a data processing method. The data processing method is applied to a receiving terminal and comprises: determining whether the receiving terminal has received a second data packet when a first data packet in a plurality of data packets continuously sent by a sending terminal at an interval in a preset sending sequence is received, wherein the first data packet comprises: one data packet in the plurality of data packets, the second data packet comprises: the data packet preceding the first data packet in the plurality of data packets sent in the preset sending sequence, and a consumption sequence in which the plurality of data packets are consumed matches with the preset sending sequence; determining whether the second data packet is expired when the second data packet is not received; acquiring a consumption importance level of the second data packet when the second data packet is expired; and consuming the first data packet when the consumption importance level of the second data packet reaches a preset consumption importance level.

In a second example embodiment, the present disclosure shows a data processing method. The data processing method is applied to a sending terminal and comprises: when there is a requirement to send to a receiving terminal each data packet in a plurality of data packets continuously at an interval in a preset sending sequence, for each data packet in the plurality of data packets, setting, in a specific field of the data packet, at least an identifier for indicating a consumption importance level of a data packet preceding the data packet sent in the preset sending sequence, and setting a time interval in a preset field of the data packet, wherein the time interval comprises: a time interval between sending time when the data packet is sent and sending time when a data packet adjacent to and preceding the data packet in the preset sending sequence is sent; and sending to the receiving terminal each data packet in the plurality of data packets continuously at an interval according to the preset sending sequence and the time interval set in each data packet.

In a third example embodiment, the present disclosure shows a data processing method. The data processing method is applied to a sending terminal and comprises: when there is a requirement to send to a receiving terminal each data packet in a plurality of data packets continuously at an interval in a preset sending sequence, for each data packet in the plurality of data packets, acquiring a consumption importance level of the data packet; and acquiring the time-to-live corresponding to the consumption importance level of the data packet, wherein the time-to-live corresponding to a higher consumption importance level is greater than that corresponding to a lower consumption importance level. sending to the receiving terminal the consumption importance level and the time-to-live corresponding to the consumption importance level if the time-to-live corresponding to the consumption importance level is not sent to the receiving terminal.

In a fourth example embodiment, the present disclosure shows a data processing device. The data processing device is applied to a receiving terminal and comprises: a first determination module, used for determining whether the receiving terminal has received a second data packet when a first data packet in a plurality of data packets continuously sent by a sending terminal at an interval in a preset sending sequence is received, wherein the first data packet comprises: one data packet in the plurality of data packets, the second data packet comprises: a data packet preceding the first data packet in the plurality of data packets sent in the preset sending sequence, and a consumption sequence in which the plurality of data packets are consumed matches with the preset sending sequence; a second determination module, used for determining whether the second data packet is expired when the second data packet is not received; a first acquisition module, used for acquiring a consumption importance level of the second data packet when the second data packet is expired; and a first consumption module, used for consuming the first data packet when the consumption importance level of the second data packet reaches a preset consumption importance level.

In a fifth example embodiment, the present disclosure shows a data processing device. The data processing device is applied to a sending terminal and comprises: a setting module, used for when there is a requirement to send to a receiving terminal each data packet in a plurality of data packets continuously at an interval in a preset sending sequence, for each data packet in the plurality of data packets, setting, in a specific field of the data packet, at least an identifier for indicating a consumption importance level of a data packet preceding the data packet sent in the preset sending sequence, and setting a time interval in a preset field of the data packet, wherein the time interval comprises: a time interval between sending time when the data packet is sent and sending time when a data packet adjacent to and preceding the data packet in the preset sending sequence is sent; and a first sending module, used for sending to the receiving terminal each data packet in the plurality of data packets continuously at an interval according to the preset sending sequence and the time interval set in each data packet.

In a sixth example embodiment, the present disclosure shows a data processing device. The data processing device is applied to a sending terminal and comprises: a consumption importance level acquisition module, used for when it is required to send to a receiving terminal each data packet in a plurality of data packets continuously at an interval in a preset sending sequence, for each data packet in the plurality of data packets, acquiring a consumption importance level of the data packet; a time-to-live acquisition module, used for acquiring time-to-live corresponding to the consumption importance level of the data packet, wherein the time-to-live corresponding to a higher consumption importance level is greater than that corresponding to a lower consumption importance level; and a time-to-live sending module, used for sending to the receiving terminal the consumption importance level and the time-to-live corresponding to the consumption importance level if the time-to-live corresponding to the consumption importance level is not sent to the receiving terminal.

In a seventh example embodiment, the present disclosure shows an electronic device. The electronic device comprises: a processor and a memory used for storing an instruction executable by the processor, wherein the processor is configured to perform the method shown in any of the above-described method embodiments.

In an eighth example embodiment, the present disclosure shows a non-transitory computer-readable storage medium that, when the instruction in the storage medium is executed by a processor of an electronic device, enables the electronic device to execute the method shown in any of the above-described method embodiments.

In a ninth example embodiment, the present disclosure shows a computer program product that, when the instruction in the computer program product is executed by a processor of an electronic device, enables the electronic device to execute the method shown in any of the above-described method embodiments.

Compared with the conventional techniques, the present disclosure has the following advantages.

In the present disclosure, whether the receiving terminal has received a second data packet is determined when a first data packet in a plurality of data packets continuously sent by a sending terminal at an interval in a preset sending sequence is received. The first data packet comprises: one data packet in the plurality of data packets, and the second data packet comprises the data packet preceding the first data packet in the plurality of data packets sent in the preset sending sequence. A consumption sequence in which the plurality of data packets is consumed matches with the preset sending sequence. Whether the second data packet is expired is determined when the second data packet is not received. Whether the consumption importance level of the second data packet is the preset consumption importance level is acquired when the second data packet is expired. When the consumption importance level of the second data packet is the preset consumption importance level, the first data packet is consumed.

In the present disclosure, if the consumption importance level of the received second data packet is the preset consumption importance level, it is indicated that the second data packet has little or no influence on the consumption of other data packets, and consuming the plurality of data packets except the second data packet does not affect the consumption result. In other words, the result obtained by consuming the plurality of data packets other than the second data packet is the same as or similar to the result obtained by consuming all the plurality of data packets. Therefore, in this case, in order to enable applications corresponding to the plurality of data packets to be responded to in time, it is required to meet the real-time requirements of data packet consumption. Instead of waiting for the second data packet, the first data packet which is located after the second data packet according to the consumption sequence can be consumed directly, so that the consumption result can be obtained timely such that the applications corresponding to the plurality of data packets can be responded to in time, a delayed response to the applications is avoided. For example, the fluency of the application is improved.

BRIEF DESCRIPTION OF DRAWINGS

To describe the technical solutions in the embodiments of the present disclosure more clearly, the following briefly describes the accompanying drawings needed for describing the embodiments. Apparently, the accompanying drawings in the following description show some instead of all embodiments of the present disclosure, and those of ordinary skill in the art may further derive other accompanying drawings from these accompanying drawings without creative efforts.

FIG. 4 is a flow chart of steps of a method for determining whether a data packet is expired according to the present disclosure;

FIG. 5 is a flow chart of steps of a method for determining whether a data packet is expired according to the present disclosure;

FIG. 6 is a flow chart of steps of a data processing method according to the present disclosure;

DESCRIPTION OF EMBODIMENTS

In order to make the above objects, features, and advantages of the present disclosure clearer and easier to understand, the present disclosure will be described in further detail below with reference to the drawings and examples.

Figure 1:
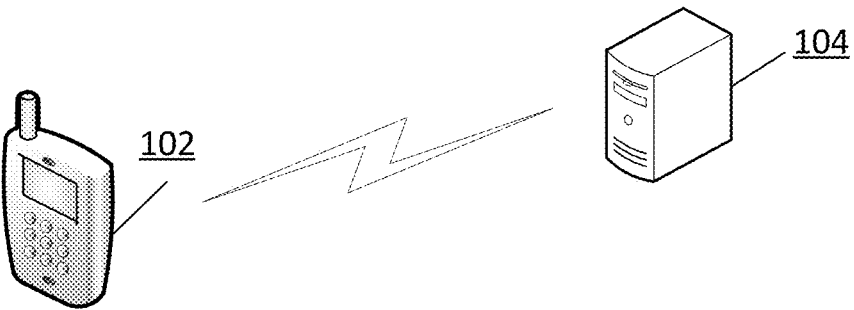
FIG. 1 is a structural block diagram of a data processing system according to the present disclosure.

FIG. 1 shows a structural block diagram of a data processing system according to the present disclosure, and the system comprises a sending terminal 102 and a receiving terminal 104. The sending terminal and the receiving terminal are communicated, and data interaction can be carried out between the sending terminal and the receiving terminal. The sending terminal may comprise front-end equipment, back-end equipment or the like, and the receiving terminal may also comprise front-end equipment or back-end equipment. In one example, the sending terminal may comprise front-end equipment, and the receiving terminal may comprise back-end equipment. The front-end equipment may comprise a mobile phone, a tablet computer, a notebook computer, and a desktop computer. The back-end equipment may comprise a back-end server or the like.

Figure 2:
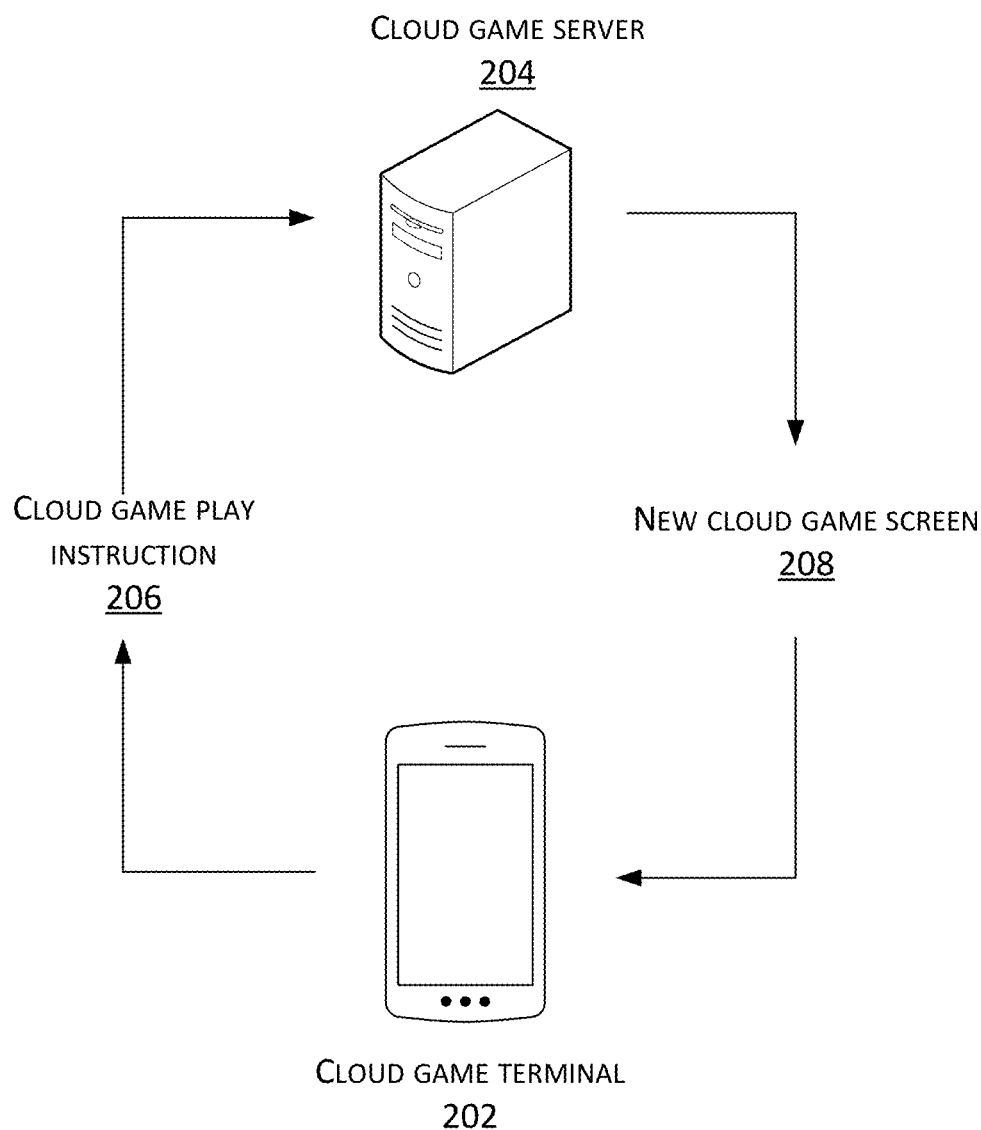
FIG. 2 is a schematic diagram of a scenario according to the present disclosure.

Referring to FIG. 2, in an example scenario, the sending terminal may be a cloud game terminal 202 or the like, and the receiving terminal may be a cloud game server 204 or the like. In the process of cloud game, a user can input a cloud game play instruction 206 (such as an instruction of tapping or sliding the screen, etc.) for the cloud game on the cloud game terminal 202. The cloud game terminal 202 sends the cloud game play instruction 206 to the cloud game server 204. The cloud game server 204 receives the cloud game play instruction 206, responds to the cloud game play instruction 206 for the cloud game, obtains a new cloud game screen 208 corresponding to the cloud game play instruction 206, and sends the new cloud game screen 208 to the cloud game terminal. The cloud game terminal 202 receives the new cloud game screen 208 and displays the new cloud game screen 208.

In an example scenario, the sending terminal needs to continuously send a plurality of data packets to the receiving terminal at an interval in a preset sending sequence. Generally, the receiving terminal will receive the plurality of data packets according to a receiving sequence corresponding to the preset sending sequence, and consume the plurality of data packets. However, sometimes at least one data packet in the plurality of data packets will be lost during transmission. In this case, the receiving terminal can receive part of the plurality of data packets.

When the receiving terminal receives the part of the plurality of data packets, see the embodiments shown below regarding how to handle this situation.

When the sending terminal determines that the receiving terminal does not receive the at least one data packet in the plurality of data packets, see the embodiments shown below regarding how to handle this situation.

Figure 3:
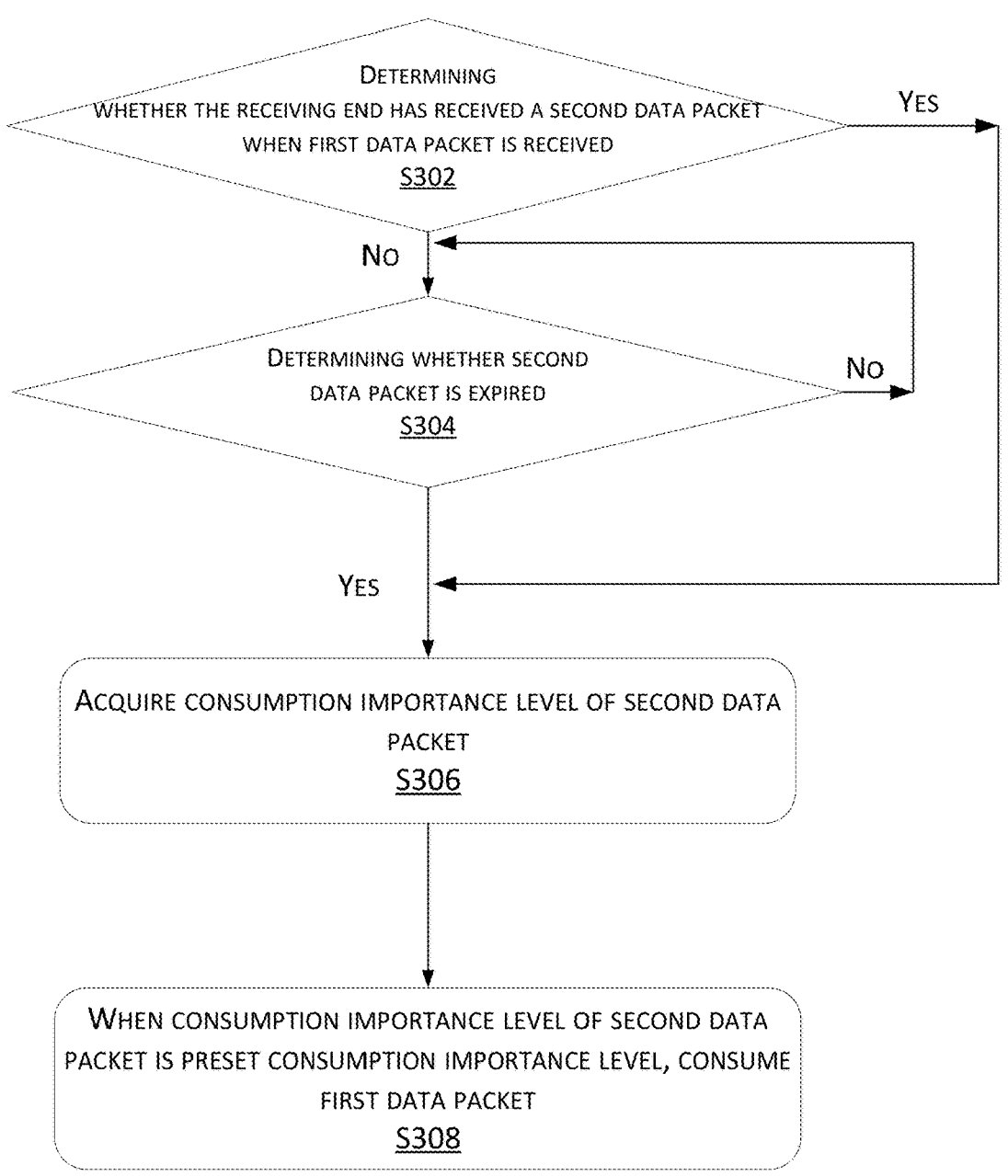
FIG. 3 is a flow chart of steps of a data processing method according to the present disclosure.

Referring to FIG. 3, a flow chart of steps of a data processing method according to the present disclosure is shown. The method is applied to the receiving terminal shown in FIG. 1 and may specifically comprise the following steps:

In step S302, whether the receiving terminal has received a second data packet is determined when a first data packet in the plurality of data packets continuously sent by the sending terminal at an interval in a preset sending sequence is received.

The first data packet comprises one data packet in the plurality of data packets. The second data packet comprises: a data packet preceding the first data packet in the plurality of data packets sent in the preset sending sequence. A consumption sequence in which the plurality of data packets is consumed matches with the preset sending sequence.

In the present disclosure, before the sending terminal continuously sends a plurality of data packets at an interval in the preset sending sequence, a respective preset sending sequence will be set for each data packet. For example, the plurality of data packets is numbered according to the respective preset sending sequence. For example, the data packet located at the first position in the preset sending sequence is numbered 01, the data packet located at the second position in the preset sending sequence is numbered 02, the data packet located at the third position in the preset sending sequence is numbered 03 . . . . By analogy, the data packet located at the Nth position in the preset sending sequence is numbered N. N is the number of the plurality of data packets.

In this way, when receiving one data packet in the plurality of data packets, the receiving terminal can extract the number of the data packet and extract the numbers of other data packets previously received in the plurality of the data packets.

If numbers smaller than the number of the data packet correspond to the numbers of other data packets one to one, it is indicated that the data packets in the plurality of data packets preceding the data packet in the preset sending sequence are all received by the receiving terminal.

If a number other than the numbers of other data packets exists in the numbers smaller than the number of the data packet, it is indicated that the receiving terminal does not receive the data packet corresponding to this number.

For example, the receiving terminal, when receiving the first data packet, can extract the number of the first data packet and extract the numbers of other data packets in the plurality of data packets previously received.

If numbers smaller than the number of the first data packet correspond to the numbers of other data packets one to one, it is indicated that the data packets in the plurality of data packets preceding this first data packet in the preset sending sequence are all received by the receiving terminal, so no second data packet is present. If a number other than the numbers of other data packets exists in the numbers smaller than the number of this data packet, it is indicated that the receiving terminal does not receive the data packet corresponding to this number. That is, the second data packet is received.

When the second data packet is not received, in step S304, whether the second data packet is expired is determined.

For any data packet in the plurality of data packets, the receiving terminal needs to receive and consume the data packet within the time-to-live of the data packet from the sending time when the sending terminal sends the data packet to the receiving terminal. That is, after the sending terminal sends the data packet to the receiving terminal, if the difference between the current time of the receiving terminal and the sending time is greater than the time-to-live of the data packet and the receiving terminal has not yet received the data packet, it is indicated that the data packet is expired. Alternatively, if the difference between the current time of the receiving terminal and the sending time is less than or equal to the time-to-live of the data packet, it is indicated that the data packet is not expired. The same is true for other data packets of the plurality of data packets.

For determining whether the second data packet is expired, refer to the following embodiments as shown in FIG. 4, which will not be detailed here.

In another embodiment of the present disclosure, when the second data packet is received, since the sending time when the sending terminal sends the second data packet to the receiving terminal is earlier than the sending time when the sending terminal sends the first data packet to the receiving terminal, the receiving terminal will receive the second data packet before receiving the first data packet, and will consume the second data packet after receiving the second data packet. In this way, when the receiving terminal receives the first data packet after receiving the second data packet, the second data packet has often been consumed by the receiving terminal, so that the receiving terminal can consume the first data packet, then continue to receive one, which is located after the first data packet, of the plurality of data packets continuously sent by the sending terminal at an interval in the preset sending sequence, and perform the process similar to step S302 on the received data packet located after the first data packet.

When the second data packet is expired, in step S306, the consumption importance level of the second data packet is acquired.

In an embodiment of the present disclosure, if the consumption importance level of the data packet located at the last position in the preset sending sequence in the plurality of data packets is a non-preset consumption importance level by default, regardless of whether the first data packet is the data packet located at the last position in the preset sending sequence, the consumption importance level of the second data packet can be acquired as the preset consumption importance level.

In another embodiment of the present disclosure, for the first data packet, before sending the first data packet to the receiving terminal, the sending terminal will set an identifier set including a plurality of identifiers in a specific field of the first data packet, and one identifier may be a character.

The last identifier in the identifier set is used to indicate the consumption importance level of the first data packet. For example, when the identifier is 0, it is indicated that the consumption importance level of the corresponding data packet is the preset consumption importance level, and when the identifier is 1, it is indicated that the consumption importance level of the corresponding data packet is a non-preset consumption importance level.

The identifiers in the identifier set preceding the last identifier are used to indicate the consumption importance levels of the data packets preceding the first data packet according to the preset consumption sequence, respectively.

Then, the first data packet with the identifier set is sent to the receiving terminal.

In this way, in this step, the receiving terminal can extract the identifier set from the specific field of the first data packet, then determine the identifier corresponding to the second data packet in the identifier set (for example, the identifier corresponding to the second data packet is determined from the identifier set according to the number corresponding to the preset sending sequence set in the received data packet in step S302), and acquire the consumption importance level of the second data packet according to the identifier corresponding to the second data packet.

For example, when the identifier corresponding to the second data packet is 0, the consumption importance level of the second data packet can be acquired as the preset consumption importance level, and when the identifier corresponding to the second data packet is 1, the consumption importance level of the second data packet can be acquired as a non-preset consumption importance level.

In another embodiment of the application, if the second data packet is not expired, return to executing step S304 after a period of time or return to executing step S304 in real time until it is determined that the second data packet is expired before the receiving terminal receives the second data packet or until the second data packet is consumed.

In step S308, when the consumption importance level of the second data packet is the preset consumption importance level, the first data packet is consumed.

The consumption importance levels in the present disclosure comprise a preset consumption importance level and a non-preset consumption importance level.

In the present disclosure, the consumption importance levels of the plurality of data packets are different. For example, some data packets have low consumption importance levels which may be preset consumption importance levels. However, some data packets have high consumption importance levels which may be a non-preset consumption importance levels.

For the plurality of data packets, if the receiving terminal can receive all the plurality of data packets sent by the sending terminal, when the receiving terminal consumes the plurality of data packets, it is necessary for the receiving terminal to consume the plurality of data packets in turn according to the consumption sequence. However, sometimes, at least one data packet in the plurality of data packets may be lost during transmission, so that the receiving terminal does not receive the lost data packet. In this way, the receiving terminal receives a part of the plurality of data packets, but cannot receive the lost at least one data packet.

The consumption importance level of the lost at least one data packet may be a preset consumption importance level (low level) or a non-preset consumption importance level (high level).

If the consumption importance level of the lost at least one data packet is the preset consumption importance level, it is indicated that the lost at least one data packet has little or no influence on the consumption of other data packets, and the consumption of the part of the plurality of data packets does not affect the consumption result. In other words, the result obtained after consuming a part of the plurality of data packets is the same as or similar to the result obtained after consuming all the plurality of data packets. Therefore, in this case, in order to enable applications corresponding to the plurality of data packets to be responded to in time, it is required to meet the real-time requirements of data packet consumption. Instead of waiting for the lost at least one data packet, the part of the plurality of data packets received can be consumed directly.

For example, when the consumption importance level of the second data packet is the preset consumption importance level, the first data packet which is located after the second data packet according to the consumption sequence can be consumed directly instead of waiting for the second data packet, so that the consumption result can be obtained as soon as possible. For example, applications corresponding to the plurality of data packets can be responded to in time.

In the present disclosure, whether the receiving terminal has received a second data packet is determined when a first data packet in a plurality of data packets continuously sent by a sending terminal at an interval in a preset sending sequence is received. The first data packet comprises one data packet in the plurality of data packets, and the second data packet comprises: a data packet preceding the first data packet in the plurality of data packets sent in the preset sending sequence. A consumption sequence in which the plurality of data packets is consumed matches with the preset sending sequence. Whether the second data packet is expired is determined when the second data packet is not received. Whether the consumption importance level of the second data packet is the preset consumption importance level is acquired when the second data packet is expired. When the consumption importance level of the second data packet is the preset consumption importance level, the first data packet is consumed.

In the present disclosure, if the consumption importance level of the received second data packet is the preset consumption importance level, it is indicated that the second data packet has little or no influence on the consumption of other data packets, and consuming the plurality of data packets except the second data packet does not affect the consumption result. In other words, the result obtained by consuming the plurality of data packets other than the second data packet is the same as or similar to the result obtained by consuming all the plurality of data packets. Therefore, in this case, in order to enable applications corresponding to the plurality of data packets to be responded to in time, it is required to meet the real-time requirements of data packet consumption. Instead of waiting for the second data packet, the first data packet which is located after the second data packet according to the consumption sequence can be consumed directly, so that the consumption result can be obtained as possible as soon, for example, the applications corresponding to the plurality of data packets can be responded to in time, a delayed response to the applications is avoided, and for example, the fluency of the application can be improved.

The purpose of the embodiment shown in FIG. 3 is that when the first data packet is received but the second data packet is not received, if the consumption importance level of the second data packet is the preset consumption importance level, the first data packet can be consumed directly instead of waiting for the second data packet, so that the applications corresponding to the plurality of data packets can be responded to in time. However, sometimes, the plurality of data packets also has other data packets located after the first data packet in the preset sending sequence. After the first data packet is consumed, the other data packets located after the first data packet need to be consumed in sequence, so that applications corresponding to the plurality of data packets can be responded to.

In an example case, the importance level of the first data packet is a non-preset consumption importance level, that is, the first data packet needs to be consumed in time (it should be consumed before becoming expired).

Since the first data packet needs to be consumed in time (it should be consumed before becoming expired), in the present disclosure, when the first data packet in the plurality of data packets continuously sent by the sending terminal at an interval in the preset sending sequence is received and the second data packet is not received, step S304 needs to be executed immediately to consume the first data packet as soon as possible, so that applications corresponding to the plurality of data packets can be responded to in time.

In another example case, the importance level of the first data packet is a non-preset consumption importance level, that is, the first data packet does not need to be consumed in time (it can be consumed after becoming expired). The importance level of a data packet located after the first data packet is a non-preset consumption importance level, the data packet needs to be consumed in time (it should be consumed before becoming expired). However, at this time, if the receiving terminal has not yet received the data packet located after the first data packet, the receiving terminal also cannot consume the data packet located after the first data packet.

Since the first data packet does not need to be consumed in time (it can be consumed after becoming expired), in the present disclosure, when the first data packet in the plurality of data packets continuously sent by the sending terminal at an interval in the preset sending sequence is received and the second data packet is not received, the second data packet can be waited instead of immediately executing step S304. The second data packet can be consumed as much as possible without affecting timely responses to the applications corresponding to the plurality of data packets, so as to achieve the integrity and accuracy of the responses to the applications corresponding to the plurality of data packets.

Therefore, on the basis of the embodiment shown in FIG. 3, in another embodiment of the present disclosure, when the first data packet in the plurality of data packets continuously sent by the sending terminal at an interval in the preset sending sequence is received and the second data packet is not received, the consumption importance level of the first data packet is acquired. When the consumption importance level of the first data packet is a non-preset consumption importance level, step S304 is executed to determine whether the second data packet is expired.

In an embodiment of the present disclosure, if the consumption importance level of the data packet located at the last position in the preset sending sequence is a non-preset consumption importance level by default, when the first data packet is the data packet located at the last position in the preset sending sequence, the consumption importance level of the second data packet can be acquired as a non-preset consumption importance level. When the first data packet is not the data packet located at the last position in the preset sending sequence, the consumption importance level of the second data packet can be acquired as the preset consumption importance level.

In another embodiment of the present disclosure, for the first data packet, before sending the first data packet to the receiving terminal, the sending terminal will set an identifier set including a plurality of identifiers in a specific field of the first data packet, and one identifier may be a character.

The last identifier in the identifier set is used to indicate the consumption importance level of the first data packet. For example, when the identifier is 0, it is indicated that the consumption importance level of the corresponding data packet is the preset consumption importance level, and when the identifier is 1, it is indicated that the consumption importance level of the corresponding data packet is a non-preset consumption importance level.

The identifiers in the identifier set preceding the last identifier are used to indicate the consumption importance levels of the plurality of data packets preceding the first data packet according to the preset consumption sequence, respectively.

Then, the first data packet with the identifier set is sent to the receiving terminal.

In this way, in this step, the receiving terminal can extract the identifier set from the specific field of the first data packet, then determine the identifier corresponding to the first data packet in the identifier set (for example, the identifier corresponding to the first data packet is determined from the identifier set according to the number corresponding to the preset sending sequence set in the received data packet in step S302), and acquire the consumption importance level of the first data packet according to the identifier corresponding to the first data packet.

For example, when the identifier corresponding to the first data packet is 0, the consumption importance level of the first data packet can be acquired as the preset consumption importance level, and when the identifier corresponding to the first data packet is 1, the consumption importance level of the first data packet can be acquired as a non-preset consumption importance level.

In addition, in another embodiment of the present disclosure, if the consumption importance level of the lost at least one data packet is a non-preset consumption importance level, it is indicated that the lost at least one data packet has large influence on the consumption of other data packets, and the consumption of the part of the plurality of data packets affects the consumption result. In other words, the result obtained after consuming part of the plurality of data packets is quite different from the result obtained after consuming all the plurality of data packets. Therefore, in this case, in order to enable the applications corresponding to the plurality of data packets to be completely and accurately responded to, the lost at least one data packet can be waited until they are obtained, and then all the plurality of data packets are consumed according to the consumption sequence.

For example, when the consumption importance level of the second data packet is a non-preset consumption importance level, the second data packet can be waited until it is received, then the second data packet is consumed, and next, the first data packet which is located after the second data packet according to the consumption sequence is consumed, so that the applications corresponding to the plurality of data packets can be responded to completely and accurately.

In the present disclosure, when the first data packet in the plurality of data packets continuously sent by the sending terminal at an interval in the preset sending sequence, the process of step S302 to step S308 can be executed periodically, and the period can be set to be short, that is, the efficiency of executing steps S302 to S308 can be high, so that it can avoid the situation as much as possible that data packets with a non-preset consumption importance level (important) are expired and are not executed.

Further, in order to enable applications corresponding to the plurality of data packets to be responded to in time, in another embodiment of the present disclosure, when the third data packet is received, the third data packet can be consumed according to the consumption sequence after consuming the first data. The third data packet comprises: a data packet that is located after the first data packet according to preset sending sequence and is received by the receiving terminal.

Further, in another embodiment of the present disclosure, when the receiving terminal which has consumed the first data packet receives the second data packet (possibly when the receiving terminal determines that the second data packet is expired, but is still being transmitted to the receiving terminal, etc.), the second data packet can be discarded, since the first data packet is consumed, the plurality of data packets have a consumption sequence, and not consuming the second data packet often does not have large influence on the integrity and accuracy of the responses to applications corresponding to the plurality of data packets.

In an embodiment of the present disclosure, referring to FIG. 4, step S304 comprises:

In step S402, the delay duration of the first data packet is acquired, and the time-to-live of the first data packet is acquired.

In an embodiment of the present disclosure, when acquiring the delay duration of the first data packet, the current time of the receiving terminal, the receiving time when the receiving terminal receives the first data packet, and the transmission duration spent on transmitting the first data packet from the sending terminal to the receiving terminal can be acquired.

Then, the delay duration of the first data packet is acquired according to the current time of the receiving terminal, the receiving time when the receiving terminal receives the first data packet, and the transmission duration spent on transmitting the first data packet from the sending terminal to the receiving terminal. For example, the difference between the current time of the receiving terminal and the receiving time when the receiving terminal receives the first data packet can be calculated, and then the sum of the difference and the transmission duration spent on transmitting the first data packet from the sending terminal to the receiving terminal can be calculated to serve as the delay duration of the first data packet.

In the present disclosure, the round-trip time between the sending terminal and the receiving terminal of a data packet is RTT (round-trip time).

The receiving terminal can calculate the RTT through the process where "the receiving terminal sends a test packet to the sending terminal, the sending terminal receives the test packet and returns a feedback packet corresponding to the test packet to the receiving terminal, and the receiving terminal sends the feedback packet." Then, the ratio of the RTT to 2 is calculated to serve as the transmission duration spent on transmitting a data packet from the sending terminal to the receiving terminal. Next, the ratio of the RTT to 2 is stored in the receiving terminal.

In this way, when acquiring the transmission duration spent on transmitting the first data packet from the sending terminal to the receiving terminal, the ratio of the RTT to 2 stored in the receiving terminal can be acquired to serve as the transmission duration spent on transmitting the first data packet from the sending terminal to the receiving terminal.

When acquiring the time-to-live of the first data packet, the time-to-live of the first data packet can be acquired according to the consumption importance level of the first data packet.

In the present disclosure, when the consumption importance level of a data packet is higher, the data packet is more important, and it is required to consume the data packet as much as possible. Otherwise, the applications corresponding to the plurality of data packets may not be completely and accurately responded to. Therefore, the time-to-live of the data packet can be set longer.

When the consumption importance level of a data packet is lower, the data packet is often less important and does not need to be consumed, and the applications corresponding to the plurality of data packets can be completely and accurately responded to. Therefore, the time-to-live of the data packet can be set shorter.

The correspondence between the consumption importance level and the time-to-live may be set in the receiving terminal in advance, and the time-to-live corresponding to each consumption importance level is recorded in the correspondence between the consumption importance level and the time-to-live. The time-to-live corresponding to each consumption importance level may be negotiated in advance by the receiving terminal, the sending terminal.

For example, in another embodiment of the present disclosure, when the sending terminal needs to continuously send the plurality of data packets to the receiving terminal at an interval in the preset sending sequence, the consumption importance level of one data packet is acquired and the time-to-live corresponding to the consumption importance level of the data packet is acquired. The time-to-live corresponding to a higher consumption importance level is greater than that corresponding to a lower consumption importance level. If the time-to-live corresponding to the consumption importance level is not sent to the receiving terminal, the consumption importance level and the time-to-live corresponding to the consumption importance level are sent to the receiving terminal so that the receiving terminal can obtain the consumption importance level and the time-to-live corresponding to the consumption importance level. Accordingly, the consumption importance level and the time-to-live corresponding to the consumption importance level can be recorded in the correspondence between the consumption importance level and the time-to-live. The same is true for other data packets of the plurality of data packets.

In this way, when the time-to-live of the first data packet is obtained according to the consumption importance level, the time-to-live corresponding to the consumption importance level of the first data packet can be searched for in the correspondence between the consumption importance level and the time-to-live. In the correspondence, the higher the consumption importance level is, the longer the time-to-live is. The lower the consumption importance level is, the shorter the time-to-live is.

In step S404, the second data packet is determined to be expired when the difference between the time-to-live of the first data packet and the delay duration of the first data packet is less than a preset duration.

The preset duration may be determined according to the actual situation, such as 5 ms, 10 ms, 15 ms, 20 ms, or the like, which is not limited in the present disclosure.

Since the sending time when the sending terminal sends the second data packet to the receiving terminal is less than the sending time when the sending terminal sends the first data packet to the receiving terminal, when both the first data packet and the second data packet are expired, the second data packet usually is expired first, and then the first data packet is expired.

In this way, when the difference between the time-to-live of the first data packet and the delay duration of the first data packet is equal to zero, it is indicated that the first data packet will become expired immediately while the second data packet is likely to become expired, and in the present disclosure, it can be regarded that the second data packet is expired.

For example, in an example, when the preset duration is the same as or less than the sending time interval (between the sending time when the sending terminal sends the first data packet and the sending time when the sending terminal sends the second data packet), if the difference between the time-to-live of the first data packet and the delay duration of the first data packet is less than the preset duration, it may be determined that the second data packet is expired.

In an embodiment of the present disclosure, referring to FIG. 5, step S304 comprises:

In step S502, the delay duration of the second data packet is acquired, and the time-to-live of the second data packet is acquired.

The delay duration of the second data packet can be acquired through the following process, including:

21) acquiring the delay duration of the first data packet, and acquiring the sending time interval between the sending time when the sending terminal sends the first data packet and the sending time when the sending terminal sends the second data packet, wherein the delay duration of the first data packet can be referred to the relevant description of step S402 above, which will not be detailed here.

In the present disclosure, the sending terminal continuously sends the plurality of data packets to the receiving terminal at an interval in the preset sending sequence of the plurality of data packets.

In this way, there is a time interval between the sending times when two data packets that are adjacent in the preset sending sequence are respectively sent, and the time intervals between the sending times when the two data packets that are adjacent in the preset sending sequence are respectively sent may be or not be the same.

Therefore, before sending any one data packet of the plurality of data packets to the receiving terminal, the sending terminal can acquire the difference between the "sending time when the data packet is about to be sent" and "the sending time of a data packet that is adjacent to and preceding the data packet in the preset sending sequence" to serve as the time interval between "the sending time when the data packet is sent" and "the sending time when a data packet that is adjacent to the data packet and preceding the data packet in the preset sending sequence is sent"; and the time interval is stored in the data packet, and then the data packet is sent to the receiving terminal. The same is true for the sending terminal before sending other data packets of the plurality of data packets to the receiving terminal.

In this way, when acquiring the sending time interval between "the sending time when the sending terminal sends the first data packet" and "the sending time when the sending terminal sends the second data packet," if the second data packet is adjacent to the first data packet in the preset sending sequence, the time interval recorded in a preset field of the first data packet can be acquired. The time interval in the preset field of the first data packet is acquired before the sending terminal sends the first data packet to the receiving terminal and is recorded in the preset field of the first data packet. According to the time interval recorded in the preset field of the first data packet, the sending time interval between "the sending time when the sending terminal sends the first data packet" and "the sending time when the sending terminal sends the second data packet" is acquired. For example, the time interval recorded in the preset field of the first data packet can serve as the sending time interval or the like between "the sending time when the sending terminal sends the first data packet" and "the sending time when the sending terminal sends the second data packet."

Alternatively, when the second data packet is not adjacent to the first data packet in the preset sending sequence, the time interval recorded in the preset field of the first data packet is acquired. The time interval in the preset field of the first data packet is acquired before the sending terminal sends the first data packet to the receiving terminal and is recorded in the preset field of the first data packet. An intermediate data packet between the second data packet and the first data packet in the preset sending sequence is determined, and the time interval recorded in the preset field of the intermediate data packet is acquired. The time interval in the preset field of the intermediate data packet is acquired before the sending terminal sends the intermediate data packet to the receiving terminal and is recorded in the preset field of the intermediate data packet. According to the time interval recorded in the preset field of the first data packet and the time interval recorded in the preset field of the intermediate data packet, the sending time interval between "the sending time when the sending terminal sends the first data packet" and "the sending time when the sending terminal sends the second data packet" is acquired. For example, the time interval recorded in the preset field of the first data packet and the time interval recorded in the preset field of the intermediate data packet can be summed to obtain the sending time interval between "the sending time when the sending terminal sends the first data packet" and "the sending time when the sending terminal sends the second data packet."

22) According to the delay duration of the first data packet and the sending time interval between "the sending time when the sending terminal sends the first data packet" and "the sending time when the sending terminal sends the second data packet," the delay duration of the second data packet is acquired.

In the present disclosure, the delay duration of the first data packet and the sending time interval may be summed to obtain the delay duration of the second data packet.

When acquiring the time-to-live of the second data packet, reference may be made to the process of acquiring the time-to-live of the first data packet described in step S402, which will not be described in detail here.

In step S504, when the delay duration of the second data packet is greater than the time-to-live of the second data packet, it is determined that the second data packet is expired.

Alternatively, in another embodiment of the present disclosure, when the delay duration of the second data packet is less than or equal to the time-to-live of the second data packet, it is determined that the second data packet is not expired.

In one example, it may be determined that the second data packet is expired when the conditions of the following formula are satisfied.

$$SentGap+current\_time-receive\_time+rtt/2>TTL.$$

SentGap is the sending time interval between the sending time when the sending terminal sends the first data packet and the sending time when the sending terminal sends the second data packet.

Current_time is the current time of the receiving terminal.

Receive_time is the receiving time when the receiving terminal receives the first data packet.

rtt/2 is the transmission duration spent on transmitting the second data packet from the sending terminal to the receiving terminal.

TTL is the time-to-live of the second data packet.

In an example, it is assumed that the plurality of data packets comprises 11 data packets, i.e., data packet 1 to data packet 11.

The sending sequence in which data packet 1 to data packet 11 are sent from the sending terminal to the receiving terminal is as follows: data packet 1 is earlier than data packet 2, data packet 2 is earlier than data packet 3 . . . and data packet 10 is earlier than data packet 11.

The consumption sequence in which data packet 1 to data packet 11 are consumed by the receiving terminal is as follows: data packet 1 is earlier than data packet 2, data packet 2 is earlier than data packet 3 . . . and data packet 10 is earlier than data packet 11.

The sending time interval between the sending times when the sending terminal sends any two data packets that are adjacent according to the sending sequence to the receiving terminal is 10 ms.

The transmission duration of each data packet transmitted from the sending terminal to the receiving terminal is 60 ms.

The consumption delay of data packet 1 to data packet 11 needs to be less than or equal to 100 ms, that is, the time-to-live is 100 ms.

Typically, when transmission of the plurality of data packets is normal, the sending time when the sending terminal respectively sends data packet 1 to data packet 11, the receiving time when the receiving terminal respectively receives data packet 1 to data packet 11, the consuming time when the receiving terminal respectively consumes data packet 1 to data packet 11, and the delay time of data packet 1 to data packet 11 can be seen in Table 1 below.

TABLE 1

| | Sending time | Receiving time | Consuming time | Delay time |
|---|---|---|---|---|
| Data packet 1 | 0 ms | 60 ms | 60 ms | 60 ms |
| Data packet 2 | 10 ms | 70 ms | 70 ms | 60 ms |
| Data packet 3 | 20 ms | 80 ms | 80 ms | 60 ms |
| Data packet 4 | 30 ms | 90 ms | 90 ms | 60 ms |
| Data packet 5 | 40 ms | 100 ms | 100 ms | 60 ms |
| Data packet 6 | 50 ms | 110 ms | 110 ms | 60 ms |
| Data packet 7 | 60 ms | 120 ms | 120 ms | 60 ms |
| Data packet 8 | 70 ms | 130 ms | 130 ms | 60 ms |
| Data packet 9 | 80 ms | 140 ms | 140 ms | 60 ms |
| Data packet 10 | 90 ms | 150 ms | 150 ms | 60 ms |
| Data packet 11 | 100 ms | 160 ms | 160 ms | 60 ms |

It is assumed that data packet 6 is lost during transmission from the sending terminal to the receiving terminal.

If the receiving terminal fails to receive the data packet 6 within 110 ms, it will send a message to the sending terminal to state that the receiving terminal has not received the data packet 6. The sending terminal will resend the data packet 6 to the receiving terminal according to the message. The transmission duration spent on transmitting the message from the receiving terminal to the sending terminal is 60 ms. The transmission duration spent on transmitting the data packet 6 from the sending terminal to the receiving terminal is 60 ms.

Therefore, if the receiving terminal receives and consumes the data packet 6 re-sent by the sending terminal at 230 ms, and the data packet 7 to the data packet 11 can also be consumed at the earliest at 230 ms.

The sending time when the sending terminal respectively sends data packet 1 to data packet 11, the receiving time when the receiving terminal respectively receives data packet 1 to data packet 11, the consuming time when the receiving terminal respectively consumes data packet 1 to data packet 11, and the delay time of data packet 1 to data packet 11 can be seen in Table 2 below.

TABLE 2

| | Sending time | Receiving time | Consuming time | Delay time |
|---|---|---|---|---|
| Data packet 1 | 0 ms | 60 ms | 60 ms | 60 ms |
| Data packet 2 | 10 ms | 70 ms | 70 ms | 60 ms |
| Data packet 3 | 20 ms | 80 ms | 80 ms | 60 ms |
| Data packet 4 | 30 ms | 90 ms | 90 ms | 60 ms |
| Data packet 5 | 40 ms | 100 ms | 100 ms | 60 ms |
| Data packet 6 | 50 ms | 230 ms | 230 ms | 180 ms |
| Data packet 7 | 60 ms | 120 ms | 230 ms | 170 ms |
| Data packet 8 | 70 ms | 130 ms | 230 ms | 160 ms |
| Data packet 9 | 80 ms | 140 ms | 230 ms | 150 ms |
| Data packet 10 | 90 ms | 150 ms | 230 ms | 140 ms |
| Data packet 11 | 100 ms | 160 ms | 230 ms | 130 ms |

The delay time of the consumption of data packets 1 to 11 needs to be less than or equal to 100 ms.

It can be seen from Table 2 that the delay time of the consumption of data packets 6 to 11 all exceeds 100 ms, which does not meet the delay requirements.

If the consumption importance level of data packet 6 is the preset consumption importance level (that is, when data packets 1 to 11 are consumed according to the consumption sequence, if data packet 6 does not necessarily need to be consumed), the data packets 7 to 11 can be directly consumed according to the consumption sequence when the delay time of data packet 7 is about to exceed 100 ms, so that the delay time of the data packets 7 to 11 is less than or equal to 100 ms.

Specifically, the sending time when the sending terminal respectively sends data packet 1 to data packet 11, the receiving time when the receiving terminal respectively receives data packet 1 to data packet 11, the consuming time when the receiving terminal respectively consumes data packet 1 to data packet 11, and the delay time of data packet 1 to data packet 11 can be seen in Table 3 below.

TABLE 3

| | Sending time | Receiving time | Consuming time | Delay time |
|---|---|---|---|---|
| Data packet 1 | 0 ms | 60 ms | 60 ms | 60 ms |
| Data packet 2 | 10 ms | 70 ms | 70 ms | 60 ms |
| Data packet 3 | 20 ms | 80 ms | 80 ms | 60 ms |
| Data packet 4 | 30 ms | 90 ms | 90 ms | 60 ms |
| Data packet 5 | 40 ms | 100 ms | 100 ms | 60 ms |
| Data packet 6 | 50 ms | 230 ms | 230 ms | 180 ms |
| Data packet 7 | 60 ms | 120 ms | 160 ms | 100 ms |
| Data packet 8 | 70 ms | 130 ms | 160 ms | 90 ms |
| Data packet 9 | 80 ms | 140 ms | 160 ms | 80 ms |
| Data packet 10 | 90 ms | 150 ms | 160 ms | 90 ms |
| Data packet 11 | 100 ms | 160 ms | 160 ms | 60 ms |

Referring to FIG. 6, a flow chart of steps of a data processing method according to the present disclosure is shown. The method is applied to the sending terminal shown in FIG. 1 and may specifically comprise the following steps:

in step S602, when there is a requirement to send to a receiving terminal each data packet in a plurality of data packets continuously at an interval in a preset sending sequence, for each data packet in the plurality of data packets, setting, in a specific field of the data packet, at least an identifier for indicating a consumption importance level of a data packet preceding the data packet sent in the preset sending sequence, and setting a time interval in a preset field of the data packet, wherein the time interval comprises: a time interval between the sending time when the data packet is sent and the sending time when a data packet that is adjacent to the data packet and preceding the data packet in the preset sending sequence is sent; and in step S604, sending to the receiving terminal each data packet in the plurality of data packets continuously at an interval according to the preset sending sequence and the time interval set in each data packet.

In the present disclosure, it supports determining whether the receiving terminal has received the second data packet when the first data packet in the plurality of data packets continuously sent by the sending terminal at an interval in the preset sending sequence. The first data packet comprises one data packet in the plurality of data packets, and the second data packet comprises: a data packet preceding the first data packet in the plurality of data packets sent in the preset sending sequence. A consumption sequence in which the plurality of data packets is consumed matches with the preset sending sequence. When the second data packet is not received, it can be determined whether the second data packet is expired through at least the time interval in the preset field in the first data packet. When the second data packet is expired, whether the consumption importance level of the second data packet is the preset consumption importance level can be acquired according to the identifier in the specific field of the first data packet that indicates the consumption importance level of the data packets (including the second data packet) preceding the first data packet in the preset sending sequence. When the consumption importance level of the second data packet is the preset consumption importance level, the first data packet is consumed.

If the consumption importance level of the second data packet received by the receiving terminal is the preset consumption importance level, it is indicated that the second data packet has little or no influence on the consumption of other data packets, and consuming the plurality of data packets except the second data packet does not affect the consumption result. In other words, the result obtained by consuming the plurality of data packets other than the second data packet is the same as or similar to the result obtained by consuming all the plurality of data packets. Therefore, in this case, in order to enable applications corresponding to the plurality of data packets to be responded to in time, it is required to meet the real-time requirements of data packet consumption. Instead of waiting for the second data packet, the first data packet which is located after the second data packet according to the consumption sequence can be consumed directly, so that the consumption result can be obtained as possible as soon, for example, the applications corresponding to the plurality of data packets can be responded to in time, a delayed response to the applications is avoided, and for example, the fluency of the application can be improved.

In the present disclosure, when each data packet of the plurality of data packets is sent to the receiving terminal, the data packet can be cached in the resending queue so that the data packet can be resent to the receiving terminal when it is determined that the data packet cannot be received by the receiving terminal due to loss in the transmission process.

For example, within a period of time after the sending terminal sends the data packet to the receiving terminal, the sending terminal receives a reception response, which indicates that the data packet is received, returned by the receiving terminal, and thus it is no longer necessary to re-send the data packet to the receiving terminal.

Within a period of time after the sending terminal sends the data packet to the receiving terminal, the sending terminal does not receive a reception response, which indicates that the data packet is received, returned by the receiving terminal, and thus it is no longer necessary to re-send the data packet to the receiving terminal, that is, the sending terminal can resend the data packet to the receiving terminal.

Moreover, the sending terminal can also record the sending time when sending the data packet to the receiving terminal.

An identifier for indicating the consumption importance level of the data packet is also set in the specific field in the data packet.

When the identifier set in the specific field in the data packet to indicate the consumption importance level of the data packet is the identifier of the preset consumption importance level, it can be determined whether the first difference between the current time of the sending terminal and the sending time is greater than a second difference between the time-to-live and the transmission duration of the data packet. The transmission duration comprises the duration of the process of transmitting the data packet from the sending terminal to the receiving terminal.

When the first difference is greater than the second difference, even if the data packet is resent to the receiving terminal immediately, since the process of transmitting the data packet from the sending terminal to the receiving terminal still takes time to transmit, the data packet will become expired before the receiving terminal receives the resent data packet. In the present disclosure, the receiving terminal will consume data packets located after the data packet in the preset sending sequence before the data packet is about to expire, and will not consume the data packet after that. Therefore, it is not required for the sending terminal to resend the data packet to the receiving terminal, otherwise network resources will be wasted. Therefore, the sending terminal can delete the data packet in the duplicate queue.

In addition, when the first difference is less than or equal to the second difference, the data packet can be resent to the receiving terminal, so that the data packet will not become expired before the receiving terminal receives the resent data packet. In the present disclosure, the receiving terminal waits for consuming the data packet before the data packet is expired, instead of consuming the plurality of data packets located after the data packet in the preset sending sequence. Therefore, the sending terminal can resend the data packet to the receiving terminal, so that the receiving terminal can obtain the data packet and consume the data packet as much as possible.

The sending terminal determines whether a reception response, returned by the receiving terminal to indicate that the data packet is received, is received. The data packet is sent to the receiving terminal when no reception response is received.

When the reception response is received, it is indicated that the receiving terminal obtains the data packet, so it is not required to resend the data packet to the receiving terminal.

In another embodiment of the present disclosure, when the sending terminal needs to continuously send all data packets of a plurality of data packets to the receiving terminal at an interval in the preset sending sequence, the consumption importance level of any one data packet of the plurality of data packets can be acquired. Then, the coding redundancy corresponding to the consumption importance level of the data packet is acquired, wherein the coding redundancy corresponding to a higher consumption importance level is greater than that of a lower consumption importance level; Next, the plurality of data packets is encoded based on the coding redundancy to obtain a redundant data packet corresponding to the data packet, which is then sent to the receiving terminal. In this way, the receiving terminal can receive the redundant data packet corresponding to the data packet. The same is true for other data packets of the plurality of data packets.

In this way, when the receiving terminal receives the first data packet in the plurality of data packets that the sending terminal sends continuously at an interval in the preset sending sequence, if the second data packet is not received and is not expired, the receiving terminal can determine whether the redundant data packet corresponding to the second data packet is received, If the redundant data packet corresponding to the second data packet sent by the sending terminal is received, an attempt may be made to recover the second data packet according to the redundant data packet corresponding to the second data packet and the received data packet. The redundancy packet corresponding to the second data packet is obtained by the receiving terminal after encoding the plurality of data packets based on coding redundancy corresponding to the consumption importance level of the second data packet.

When the second data packet is recovered, the second data packet can be consumed, and then the first data packet can be consumed. When the second data packet is not recovered, the step of determining whether the second data packet is expired is returned to and executed.

In this embodiment, when the receiving terminal receives both the second data packet and the redundant data packet corresponding to the second data packet, an attempt may be made to recover the second data packet according to the redundant data packet corresponding to the second data packet, so as to improve the possibility that the receiving terminal can obtain the second data packet, thereby improving the possibility that the receiving terminal can consume the second data packet.

Secondly, since the demand for consumption of a data packet with higher consumption importance level is greater and the demand for consumption of a data packet with lower consumption importance level is smaller (for example, it can be ignored and not consumed), the coding redundancy corresponding to a higher consumption importance level is greater than the coding redundancy corresponding to a lower consumption importance level. In this way, it is easier to recover a data packet with a higher consumption importance level according to a redundant data packet corresponding to the data packet with the higher consumption importance level, thereby increasing the possibility that the data packet with the higher consumption importance level can be consumed by the receiving terminal.

It should be noted that, for the sake of simple description, the method embodiments are all expressed as a series of action combinations, but those skilled in the art should know that the present disclosure is not limited by the described action sequence, because according to the present disclosure, certain steps may be performed in other sequences or concurrently. Moreover, those skilled in the art should also know that the embodiments described in the specification are all example embodiments, and the actions involved are not necessarily required by the present disclosure.

Figure 7:
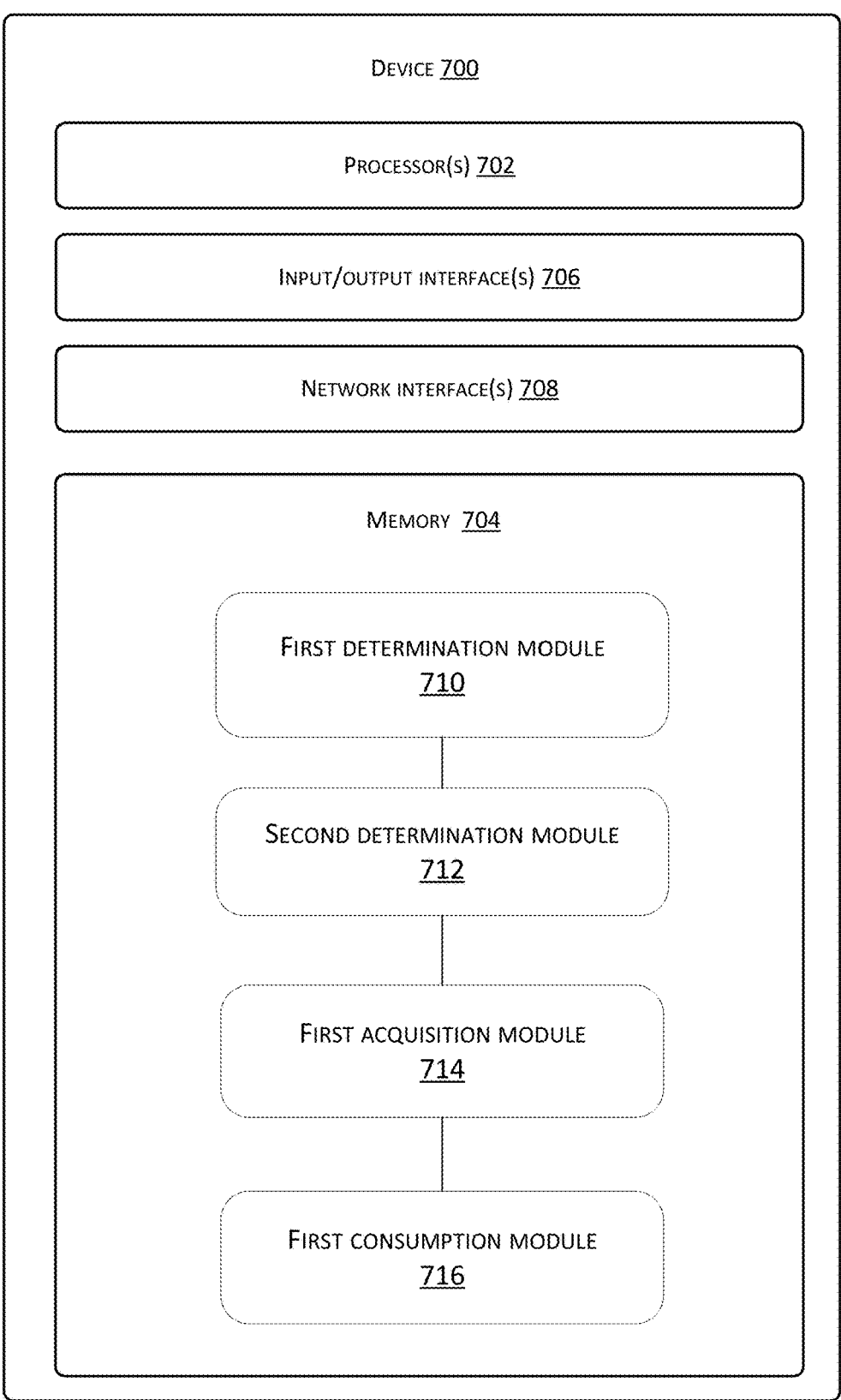
FIG. 7 is a structural block diagram of a data processing device according to the present disclosure.

Referring to FIG. 7, a structural block diagram of a data processing device 700 of the present disclosure is shown, wherein the device 700 is applied to the receiving terminal. In FIG. 7, the device 700 includes one or more processor(s) 702 or data processing unit(s) and memory 704. The device 700 may further include one or more input/output interface(s) 706 and one or more network interface(s) 708. The memory 704 is an example of computer-readable media.

Computer-readable media further include non-volatile and volatile, removable and non-removable media employing any method or technique to achieve information storage. The information may be computer-readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EE-PROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices, or any other non-transmission medium, which may be used to store information that can be accessed by a computing device. As defined herein, the computer-readable media do not include transitory media, such as modulated data signals and carriers.

The memory 704 may store therein a plurality of modules or units including:

a first determination module 710, used for determining whether the receiving terminal has received a second data packet when a first data packet in a plurality of data packets continuously sent by a sending terminal at an interval in a preset sending sequence is received, wherein the first data packet comprises: one data packet in the plurality of data packets, the second data packet comprises: a data packet preceding the first data packet in the plurality of data packets sent in the preset sending sequence, and a consumption sequence in which the plurality of data packets are consumed matches with the preset sending sequence; a second determination module 712, used for determining whether the second data packet is expired when the second data packet is not received; a first acquisition module 714, used for acquiring a consumption importance level of the second data packet when the second data packet is expired; and a first consumption module 716, used for consuming the first data packet when the consumption importance level of the second data packet reaches a preset consumption importance level.

In an example implementation, the first acquisition module comprises: a first acquisition unit, used for acquiring an identifier recorded in a specific field of the first data packet to indicate the consumption importance level of the second data packet; a second acquisition unit, used for acquiring the consumption importance level of the second data packet according to the identifier.

In an example implementation, the device further comprises: a second acquisition module, used for acquiring a consumption importance level of the first data packet when the second data packet is not received. The second determination module is also used for determining whether the second data packet is expired when the consumption importance level of the first data packet is not a non-preset consumption importance level.

In an example implementation manner, the second acquisition module comprises: a third acquisition unit, used for acquiring an identifier recorded in a specific field of the first data packet to indicate the consumption importance level of the first data packet; a fourth acquisition unit, used for acquiring the consumption importance level of the first data packet according to the identifier.

In an example implementation, the second determination module comprises: a fifth acquisition unit, used for acquiring the delay duration of the first data packet; a sixth acquisition unit, used for acquiring the time-to-live of the first data packet; and a first determination unit, used for determining that the second data packet is expired when the difference between the time-to-live of the first data packet and the delay duration of the first data packet is less than a preset duration.

In an example implementation, the second determination module comprises: a seventh acquisition unit, used for acquiring the delay duration of the second data packet; and an eighth acquiring unit, used for acquiring the time-to-live of the second data packet; a second determination unit, used for determining that the second data packet is expired when the delay duration of the second data packet is greater than the time-to-live of the second data packet.

In an example implementation, the seventh acquisition unit comprises: a first acquisition subunit, used for acquiring the delay duration of the first data packet, and, a second acquisition subunit, used for acquiring the sending time interval between the sending time when the sending terminal sends the first data packet and the sending time when the ending end sends the second data packet; and a third acquiring subunit, used for acquiring the delay duration of the second data packet according to the delay duration of the first data packet and the sending time interval.

In an example implementation, the first acquisition subunit is specifically used for: acquiring current time of the receiving terminal, acquiring receiving time when the receiving terminal receives the first data packet, and acquiring transmission duration spent on transmitting the first data packet from the sending terminal to the receiving terminal; and acquiring the delay duration of the first data packet according to the current time, the receiving time, and the transmission duration.

In an example implementation, the second acquisition subunit is specifically used for: acquiring the time interval recorded in the preset field of the first data packet when the second data packet is adjacent to the first data packet in the preset sending sequence, wherein the time interval in the preset field of the first data packet is acquired before the sending terminal sends the first data packet to the receiving terminal and is recorded in the preset field of the first data packet; acquiring the sending time interval according to the time interval recorded in the preset field of the first data packet;

or acquiring the time interval recorded in the preset field of the first data packet when the second data packet is not adjacent to the first data packet in the preset sending sequence, wherein the time interval in the preset field of the first data packet is acquired before the sending terminal sends the first data packet to the receiving terminal and is recorded in the preset field of the first data packet; determining an intermediate data packet between the second data packet and the first data packet in the preset sending sequence, and acquiring the time interval recorded in the preset field of the intermediate data packet, wherein the time interval in the preset field of the intermediate data packet is acquired before the sending terminal sends the intermediate data packet to the receiving terminal, and is recorded in the preset field of the intermediate data packet; and acquiring the sending time interval according to the time interval recorded in the preset field of the first data packet and the time interval recorded in the preset field of the intermediate data packet.

In an example implementation, the eighth acquisition unit comprises: a fourth acquisition subunit, used for acquiring the time-to-live of the second data packet according to the consumption importance level of the second data packet.

In an example implementation, the fourth acquisition subunit is specifically used for: searching for the time-to-live corresponding to the consumption importance level of the second data packet in the correspondence between the consumption importance level and the time-to-live, wherein in the correspondence, the higher the consumption importance level is, the longer the time-to-live is; and the lower the consumption importance level is, the lower the time-to-live is.

In an example implementation, the device further comprises: a second consumption module, used for consuming the third data packet according to the consumption sequence after consuming the first data when the third data packet is received, wherein the third data packet comprises: a data packet that is located after the first data packet in the preset sending sequence in the plurality of data packets and is received by the receiving terminal.

In the present disclosure, whether the receiving terminal has received a second data packet is determined when a first data packet in a plurality of data packets continuously sent by a sending terminal at an interval in a preset sending sequence is received. The first data packet comprises one data packet in the plurality of data packets, and the second data packet comprises: a data packet preceding the first data packet in the plurality of data packets sent in the preset sending sequence. A consumption sequence in which the plurality of data packets is consumed matches with the preset sending sequence. Whether the second data packet is expired is determined when the second data packet is not received. Whether the consumption importance level of the second data packet is the preset consumption importance level is acquired when the second data packet is expired. When the consumption importance level of the second data packet is the preset consumption importance level, the first data packet is consumed.

In the present disclosure, if the consumption importance level of the received second data packet is the preset consumption importance level, it is indicated that the second data packet has little or no influence on the consumption of other data packets, and consuming the plurality of data packets except the second data packet does not affect the consumption result. In other words, the result obtained by consuming the plurality of data packets other than the second data packet is the same as or similar to the result obtained by consuming all the plurality of data packets. Therefore, in this case, in order to enable applications corresponding to the plurality of data packets to be responded to in time, it is required to meet the real-time requirements of data packet consumption. Instead of waiting for the second data packet, the first data packet which is located after the second data packet according to the consumption sequence can be consumed directly, so that the consumption result can be obtained as possible as soon, for example, the applications corresponding to the plurality of data packets can be responded to in time, a delayed response to the applications is avoided, and for example, the fluency of the application can be improved.

Figure 8:
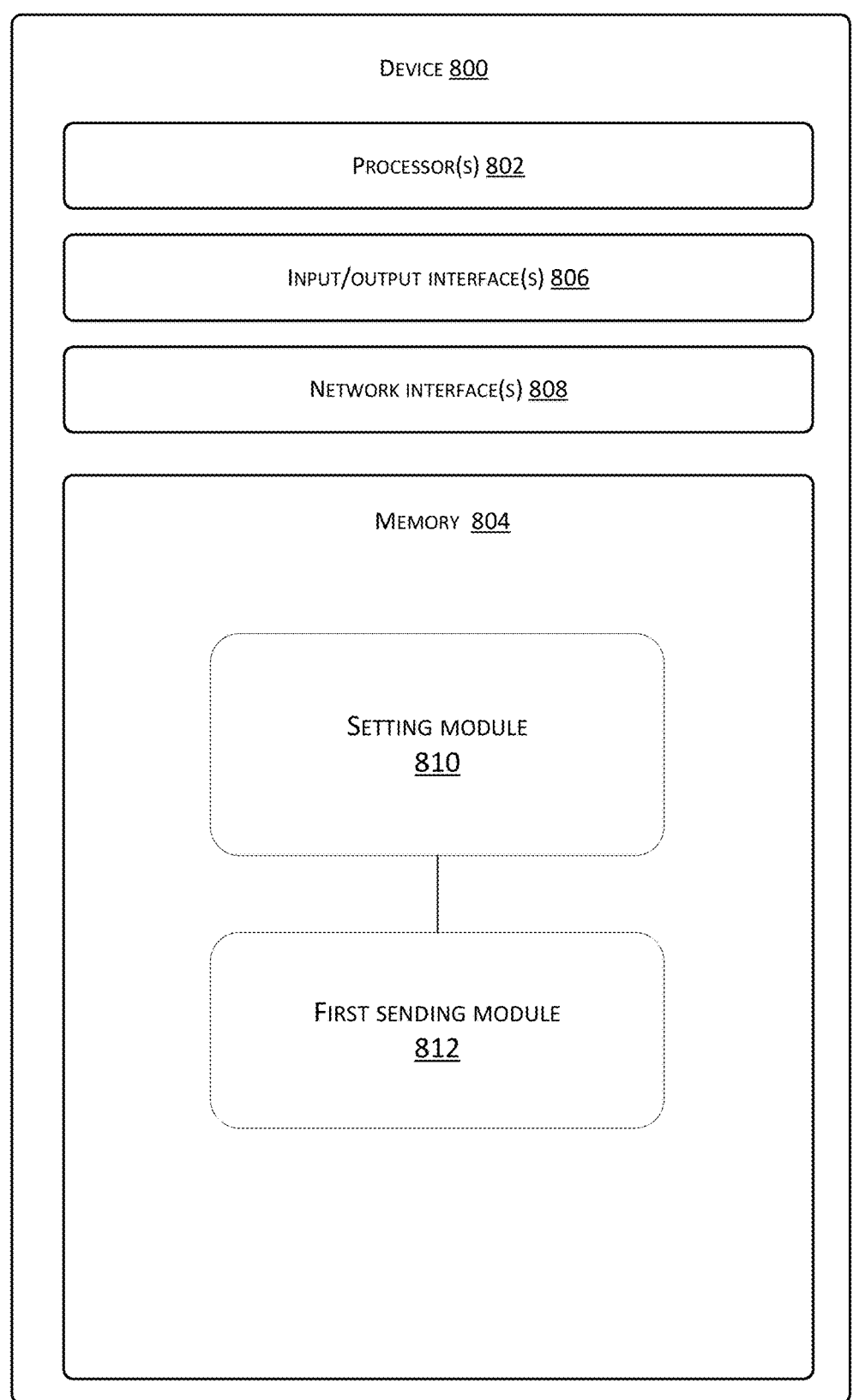
FIG. 8 is a structural block diagram of a data processing device according to the present disclosure.

Referring to FIG. 8, a structural block diagram of a data processing device 800 of the present disclosure is shown, wherein the device 800 is applied to the sending terminal. In FIG. 8, the device 800 includes one or more processor(s) 802 or data processing unit(s) and memory 804. The device 800 may further include one or more input/output interface(s) 806 and one or more network interface(s) 808. The memory 804 is an example of computer-readable media.

The memory 804 may store therein a plurality of modules or units including:

a setting module 810, used for when it is required to send to a receiving terminal each data packet in a plurality of data packets continuously at an interval in a preset sending sequence, for each data packet in the plurality of data packets, setting, in a specific field of the data packet, at least an identifier for indicating a consumption importance level of a data packet preceding the data packet sent in the preset sending sequence, and setting a time interval in a preset field of the data packet, wherein the time interval comprises: a time interval between sending time when the data packet is sent and sending time when a data packet adjacent to and preceding the data packet in the preset sending sequence is sent; and a first sending module 812, used for sending to the receiving terminal each data packet in the plurality of data packets continuously at an interval according to the preset sending sequence and the time interval set in each data packet.

In an example implementation, the device further comprises: a caching module, used for caching each data packet in the plurality of data packets in the resending queue when the data packet is sent to the receiving terminal; a recording module, used for recording the sending time when the data packet is sent to the receiving terminal, wherein an identifier for indicating the consumption importance level of the data packet is also set in the specific field in the data packet;

a third determination module, used for determining whether the first difference between the current time of the sending terminal and the sending time is greater than a second difference between the time-to-live and the transmission duration of the data packet when the identifier in the specific field in the data packet that indicates the consumption importance level of the data packet is the identifier of the preset consumption importance level, wherein the transmission duration comprises the duration of the process of transmitting the data packet from the sending terminal to the receiving terminal; and a deletion module, used for deleting the data packet from the resending queue when the first difference value is greater than the second difference value.

In an example implementation, the device further comprises: a fourth determination module, used for determining whether a reception response, returned by the receiving terminal to indicate that the data packet is received, is received when the first difference is less than or equal to the second difference; and a second sending module, used for sending the data packet to the receiving terminal when the receiving response is not received.

In the present disclosure, it supports determining whether the receiving terminal has received the second data packet when the first data packet in the plurality of data packets continuously sent by the sending terminal at an interval in the preset sending sequence. The first data packet comprises one data packet in the plurality of data packets, and the second data packet comprises: a data packet preceding the first data packet in the plurality of data packets sent in the preset sending sequence. A consumption sequence in which the plurality of data packets is consumed matches with the preset sending sequence. When the second data packet is not received, it can be determined whether the second data packet is expired through at least the sending time interval in the preset field in the first data packet. When the second data packet is expired, whether the consumption importance level of the second data packet is the preset consumption importance level can be acquired according to the identifier in the specific field of the first data packet that indicates the consumption importance level of the data packets (including the second data packet) preceding the first data packet in the preset sending sequence. When the consumption importance level of the second data packet is the preset consumption importance level, the first data packet is consumed.

If the consumption importance level of the second data packet received by the receiving terminal is the preset consumption importance level, it is indicated that the second data packet has little or no influence on the consumption of other data packets, and consuming the plurality of data packets except the second data packet does not affect the consumption result. In other words, the result obtained by consuming the plurality of data packets other than the second data packet is the same as or similar to the result obtained by consuming all the plurality of data packets. Therefore, in this case, in order to enable applications corresponding to the plurality of data packets to be responded to in time, it is required to meet the real-time requirements of data packet consumption. Instead of waiting for the second data packet, the first data packet which is located after the second data packet according to the consumption sequence can be consumed directly, so that the consumption result can be obtained as possible as soon, for example, the applications corresponding to the plurality of data packets can be responded to in time, a delayed response to the applications is avoided, and for example, the fluency of the application can be improved.

Figure 9:
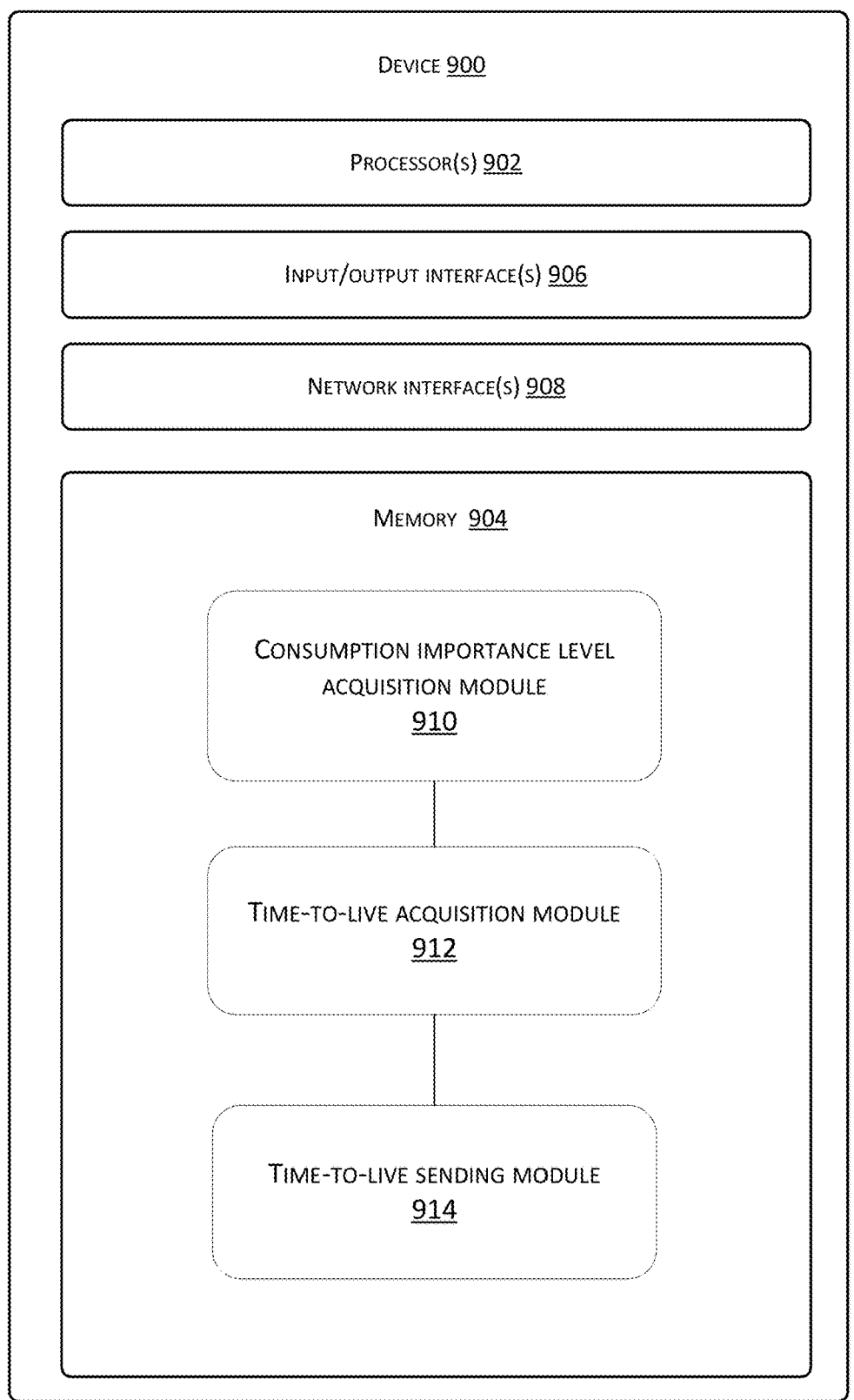
FIG. 9 is a structural block diagram of a data processing device according to the present disclosure.

Referring to FIG. 9, a structural block diagram of a data processing device 900 of the present disclosure is shown, wherein the device 900 is applied to the sending terminal. In FIG. 9, the device 900 includes one or more processor(s) 902 or data processing unit(s) and memory 904. The device 900 may further include one or more input/output interface(s) 906 and one or more network interface(s) 908. The memory 904 is an example of computer-readable media.

The memory 904 may store therein a plurality of modules or units including:

a consumption importance level acquisition module 910, used for when it is required to send to a receiving terminal each data packet in a plurality of data packets continuously at an interval in a preset sending sequence, for each data packet in the plurality of data packets, acquiring a consumption importance level of the data packet; a time-to-live acquisition module 912, used for acquiring the time-to-live corresponding to the consumption importance level of the data packet, wherein the time-to-live corresponding to a higher consumption importance level is greater than that corresponding to a lower consumption importance level; and a time-to-live sending module 914, used for sending to the receiving terminal the consumption importance level and the time-to-live corresponding to the consumption importance level if the time-to-live corresponding to the consumption importance level is not sent to the receiving terminal, so that the receiving terminal can obtain the consumption importance level and the time-to-live corresponding to the consumption importance level. Accordingly, the consumption importance level and the time-to-live corresponding to the consumption importance level can be recorded in the correspondence between the consumption importance level and the time-to-live.

Since the device embodiments are generally similar to the method embodiments, they are described simply. For relevant content, reference may be made to the description of the method embodiments.

The embodiments of the present disclosure also provide a non-volatile readable storage medium in which one or more programs are stored. When the one or more programs are applied to a device, the device can execute the instructions of the method steps in the embodiments of the present disclosure.

The embodiments of the present disclosure provide one or more machine-readable media (on which instructions are stored) that, when executed by one or more processors, cause electronic equipment to perform the method described in one or more of the above embodiments. In the embodiments of the present disclosure, the electronic equipment comprises a server, a gateway, a sub-device, etc., and the sub-device is a device such as Internet-of-things device.

The embodiments of the present disclosure may be implemented as a device for achieving a desired configuration using any appropriate hardware, firmware, software, or any combination thereof, and the device may comprise electronic equipment such as a server (cluster), terminal equipment (such as IOT equipment), and the like.

Figure 10:
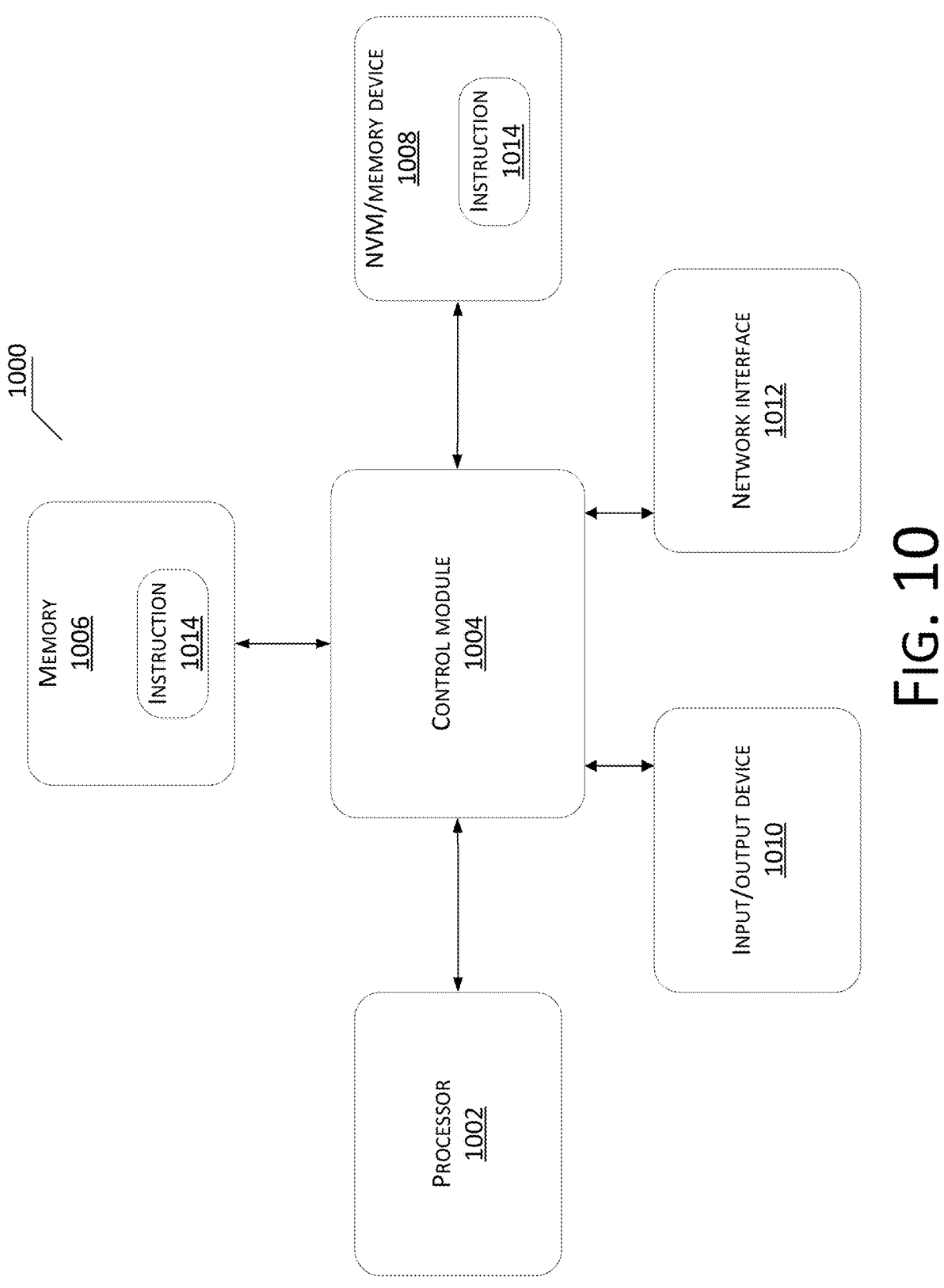
FIG. 10 is a structural block diagram of a device according to the present disclosure.

FIG. 10 schematically illustrates an exemplary device 1000 that may be used to implement various embodiments described in the present disclosure.

For one embodiment, FIG. 10 illustrates an exemplary device 1000 having one or more processors 1002, a control module (chip set) 1004 coupled to at least one of the processor(s) 1002, a memory 1006 coupled to the control module 1004, a non-volatile memory (NVM)/memory device 1008 coupled to the control module 1004, one or more input/output device(s) 1010 coupled to control module 1004, and a network interface 1012 coupled to the control module 1004.

The processor 1002 may comprise one or more single-core or multi-core processors, and the processor 1002 may comprise any combination of general-purpose processor(s) or special-purpose processor(s) (for example, a graphics processing unit, an application processor, a baseband processor, etc.). In some embodiments, the device 1000 can be used as server equipment such as the gateway described in the embodiments of the present disclosure.

In some embodiments, the device 1000 may comprise one or more computer-readable media having computer-readable instructions 1014 (e.g., a memory 1006 or NVM/memory device 1008) and is configured in combination with the one or more computer-readable media to execute the computer-readable instructions 1014 to achieve modules, so as to perform one or more processors 1002 of the actions described in the present disclosure.

For one embodiment, the control module 1004 may comprise any suitable interface controller to provide any suitable interface to at least one of the (one or more) processors 1002 and/or any suitable equipment or component in communication with the control module 1004.

The control module 1004 may comprise a memory controller module to provide an interface to the memory 1006. The memory controller module may be a hardware module, a software module, and/or a firmware module.

The memory 1006 may be used to load and store data and/or computer-readable instructions 1014, for example, for the device 1000. For one embodiment, the memory 1006 may comprise any suitable volatile memory, e.g., a suitable DRAM. In some embodiments, the memory 1006 may comprise double-data-rate fourth generation synchronous dynamic random-access memory (DDR4SDRAM).

For one embodiment, the control module 1004 may comprise one or more input/output controllers to provide an interface to the NVM/memory device 1008 and (one or more) input/output device(s) 1010.

For example, the NVM/memory device 1008 may be used to store data and/or computer-readable instructions 1014. The NVM/memory device 1008 may comprise any suitable non-volatile memory (e.g., a flash memory) and/or may comprise any (one or more) suitable non-volatile memory devices (e.g., one or more hard disk drives (HDD), one or more compact disc (CD) drives, and/or one or more digital versatile disc (DVD) drives).

The NVM/memory device 1008 may comprise storage resources that are physically part of the device on which the device 1000 is installed, or it may be accessible by the device and may not necessarily be part of the device. For example, the NVM/memory device 1008 may be accessed via input/output device(s) 1010 over a network.

The (one or more) input/output device(s) 1010 may provide an interface for the device 1000 to communicate with any other suitable device, and the input/output device(s) 1010 may comprise a communication component, a Pinyin component, a sensor component, and the like. The network interface 1012 may provide an interface for the device 1000 to communicate over one or more networks. The device 1000 may wirelessly communicate with one or more components of the wireless network according to any of one or more wireless network standards and/or protocols, for example, by accessing a wireless network (such as WiFi, 2G, 3G, 4G, 5G, etc., or a combination thereof) based on communication standards.

For one embodiment, at least one of the (one or more) processors 1002 may be encapsulated with the logic of one or more controllers (e.g., memory controller modules) of the control module 1004. For one embodiment, at least one of the (one or more) processors 1002 may be packeted with the logic of one or more controllers of the control module 1004 to form a system-in-packet (SiP). For one embodiment, at least one of the (one or more) processors 1002 may be integrated on the same die with the logic of one or more controllers of the control module 1004. For one embodiment, at least one of the (one or more) processors 1002 may be integrated on the same die with logic of one or more controllers of the control module 1004 to form a system-on-chip (SoC).

In various embodiments, the device 1000 may be, but is not limited to, a terminal device such as a server, a desktop computing device, or a mobile computing device (e.g., a laptop computing device, a handheld computing device, a tablet computer, a netbook, etc.). In various embodiments, the device 1000 may have more or fewer components and/or different architectures. For example, in some embodiments, the device 1000 comprises one or more cameras, a keyboard, a liquid crystal display (LCD) screen (including a touch-screen display), a non-volatile memory port, a plurality of antennas, a graphics chip, an application specific integrated circuit (ASIC), and a speaker.

The embodiments of the present disclosure provide an electronic device, which comprises: one or more processors; and one or more machine-readable media (on which instructions are stored) that, when executed by the one or more processors, cause the electronic device to execute one or more of the methods described in the present disclosure.

Since the device embodiments are generally similar to the method embodiments, they are described simply. For relevant content, reference may be made to the description of the method embodiments.

All embodiments of the present disclosure are described in a progressive manner, each embodiment is highlighted in differences from other embodiments, and reference can be made to each other for the same and similar parts between the embodiments.

The embodiments of the present disclosure are described with reference to flow charts and/or block diagrams of a method, a terminal device (system), and a computer program product according to the embodiments of the present disclosure. It should be understood that each procedure and/or block of the flow charts and/or block diagrams, and a combination of procedures and/or blocks in the flow charts and/or block diagrams, can be implemented by computer program instructions. These computer program instructions may be provided to a processor of a general-purpose computer, a special-purpose computer, an embedded processor or other programmable information processing devices to produce a machine such that the instructions executed by the computer or the processors of other programmable information processing devices can produce a device for achieving the functions specified in one or more procedures in the flow charts and/or one or more blocks of block diagrams.

These computer program instructions may also be stored in a computer-readable memory that can direct a computer or other programmable information processing terminal devices to operate in a particular manner, such that the instructions stored in the computer-readable memory produce a product comprising an instruction device which implements the functions specified in one or more procedures in the flowcharts and/or one or more blocks of block diagrams.

These computer program instructions may also be loaded onto a computer or other programmable information processing terminal devices such that a series of operation steps are performed on the computer or other programmable terminal device to produce a process that is implemented by the computer, and accordingly, the instructions executed on the computer or other programmable terminal devices provide steps for achieving the functions specified in one or more steps in the flow charts and/or one or more blocks of block diagrams.

While the example embodiments of the present disclosure have been described, additional variations and modifications can be made to those embodiments by those skilled in the art once they learn of the basic inventive concepts. Therefore, the accompanying claims are intended to be interpreted as including the example embodiments and all variations and modifications that fall within the scope of the embodiments of the present disclosure.

Finally, it should be noted that as used herein, relational terms such as "first" and "second" described herein may be used merely to distinguish an entity or operation from another entity or operation without necessarily requiring or implying that there is any such actual relationship or order between these entities or operations. Also, the terms "comprises," "comprising," or any other variation thereof are intended to cover a non-exclusive inclusion, such that a process, method, article, or terminal device that comprises a list of elements comprises not only those elements but also other elements not expressly listed or elements inherent to such process, method, article, or terminal device. An element defined by the phrase "comprising a . . . " does not, without more constraints, preclude the existence of additional identical elements in the process, method, article, or terminal device that comprises the element.

The data processing method and device provided by the present disclosure are introduced in detail above. In the present disclosure, specific embodiments are used to illustrate the principles and implementations of the present disclosure, and the description of the above embodiments is only used to help understand the method of the present disclosure and the core idea of the method. Meanwhile, for those skilled in the art, the specific implementations and application scope will be changed according to the idea of the present disclosure. To sum up, the content of this specification should not be construed as a limitation to the present disclosure.

The present disclosure may further be understood with clauses as follows.

Clause 1. A data processing method, wherein the method is applied to a receiving terminal and comprises:

determining whether the receiving terminal has received a second data packet when a first data packet in a plurality of data packets continuously sent by a sending terminal at an interval in a preset sending sequence is received, wherein the first data packet comprises: one data packet in the plurality of data packets, the second data packet comprises: a data packet preceding the first data packet in the plurality of data packets sent in the preset sending sequence, and a consumption sequence in which the plurality of data packets are consumed matches with the preset sending sequence;

determining whether the second data packet is expired when the second data packet is not received;

acquiring a consumption importance level of the second data packet when the second data packet is expired; and consuming the first data packet when the consumption importance level of the second data packet reaches a preset consumption importance level.

Clause 2. The method according to clause 1, wherein the method further comprises:

recovering the second data packet according to a redundant data packet corresponding to the second data packet and a received data packet if the redundant data packet corresponding to the second data packet sent by the sending terminal is received when the second data packet is not expired, wherein the redundant data packet corresponding to the second data packet is obtained by the receiving terminal after encoding the plurality of data packets based on a coding redundancy corresponding to the consumption importance level of the second data packet;

consuming the second data packet when the second data packet is recovered; and returning to the step of determining whether the second data packet is expired when the second data packet is not recovered.

Clause 3. The method according to clause 1, wherein the method further comprises:

acquiring a consumption importance level of the first data packet when the second data packet is not received; and executing the step of determining whether the second data packet is expired when the consumption importance level of the first data packet is a non-preset consumption importance level.

Clause 4. The method according to clause 1, wherein the determining whether the second data packet is expired comprises: acquiring a delay duration of the first data packet, and acquiring time-to-live of the first data packet; and determining that the second data packet is expired when a difference between the time-to-live of the first data packet and the delay duration of the first data packet is less than a preset duration.

Clause 5. The method according to clause 1, wherein the determining whether the second data packet is expired comprises:

acquiring a delay duration of the second data packet, and acquiring time-to-live of the second data packet; and determining that the second data packet is expired when the delay duration of the second data packet is greater than the time-to-live of the second data packet.

Clause 6. The method according to clause 5, wherein the acquiring the delay duration of the second data packet comprises:

acquiring the delay duration of the first data packet, and acquiring a sending time interval between sending time when the sending terminal sends the first data packet and sending time when the sending terminal sends the second data packet; and acquiring the delay duration of the second data packet according to the delay duration of the first data packet and the sending time interval.

Clause 7. The method according to clause 6, wherein the acquiring the delay duration of the first data packet comprises:

acquiring current time of the receiving terminal, acquiring receiving time when the receiving terminal receives the first data packet, and acquiring a transmission duration spent on transmitting the first data packet from the sending terminal to the receiving terminal; and acquiring the delay duration of the first data packet according to the current time, the receiving time, and the transmission duration.

Clause 8. The method according to clause 6, wherein the acquiring the time-to-live of the second data packet comprises:

acquiring the time-to-live of the second data packet according to the consumption importance level of the second data packet.

Clause 9. The method according to clause 8, wherein the acquiring the time-to-live of the second data packet according to the consumption importance level of the second data packet comprises:

searching for the time-to-live corresponding to the consumption importance level of the second data packet in a correspondence between the consumption importance level and the time-to-live, wherein in the correspondence, the higher the consumption importance level is, the longer the time-to-live is; and the lower the consumption importance level is, the lower the time-to-live is.

Clause 10. A data processing method, wherein the method is applied to a sending terminal and comprises:

when it is required to send to a receiving terminal each data packet in a plurality of data packets continuously at an interval in a preset sending sequence, for each data packet in the plurality of data packets, setting, in a specific field of the data packet, at least an identifier for indicating a consumption importance level of a data packet preceding the data packet sent in the preset sending sequence, and setting a time interval in a preset field of the data packet, wherein the time interval comprises: a time interval between sending time when the data packet is sent and sending time when a data packet adjacent to and preceding the data packet in the preset sending sequence is sent; and sending to the receiving terminal each data packet in the plurality of data packets continuously at an interval according to the preset sending sequence and the time interval set in each data packet.

Clause 11. The method according to clause 10, wherein the method further comprises:

when it is required to send to a receiving terminal each data packet in a plurality of data packets continuously at an interval in a preset sending sequence, for each data packet in the plurality of data packets, acquiring a consumption importance level of the data packet;

acquiring a coding redundancy corresponding to the consumption importance level of the data packet, wherein the coding redundancy corresponding to a higher consumption importance level is higher than that corresponding to a lower consumption importance level;

coding the plurality of data packets based on the coding redundancy to obtain a redundant data packet corresponding to the data packet; and sending to the receiving terminal the redundant data packet corresponding to the data packet.

Clause 12. A data processing method, wherein the method is applied to a sending terminal and comprises:

when it is required to send to a receiving terminal each data packet in a plurality of data packets continuously at an interval in a preset sending sequence, for each data packet in the plurality of data packets, acquiring a consumption importance level of the data packet;

acquiring time-to-live corresponding to the consumption importance level of the data packet, wherein the time-to-live corresponding to a higher consumption importance level is greater than that corresponding to a lower consumption importance level; and sending to the receiving terminal the consumption importance level and the time-to-live corresponding to the consumption importance level if the time-to-live corresponding to the consumption importance level is not sent to the receiving terminal.

Clause 13. An electronic device, comprising a memory a processor and a computer program stored on the memory and capable of running on the processor, wherein the processor implements the steps of the method according to any one of clauses 1 to 12 when executing the program.

Clause 14. A computer-readable storage medium, having a computer program stored thereon, wherein the computer program is executed by a processor to implement the steps of the method according to any one of clauses 1 to 12.

What is claimed is:

1. A method comprising:

in response to determining that a first data packet in a plurality of data packets continuously sent by a sending terminal at an interval in a preset sending sequence is received, determining that a receiving terminal has not received a second data packet, the first data packet including a data packet in the plurality of data packets and at least an identifier for indicating a consumption importance level of the second data packet preceding the first data packet in the plurality of data packets in the preset sending sequence, a consumption sequence in which the plurality of data packets are consumed matching with the preset sending sequence;

in response to determining that the receiving terminal has not received the second data packet, determining that the second data packet is expired;

in response to determining that the second data packet is expired, acquiring a consumption importance level of the second data packet; and in response to determining that the consumption importance level of the second data packet is a preset consumption importance level, consuming the first data packet.

2. The method according to claim 1, wherein the determining that the second data packet is expired comprises:

acquiring a delay duration of the first data packet and a time-to-live of the first data packet; and in response to determining that a difference between the time-to-live of the first data packet and the delay duration of the first data packet is less than a preset duration, determining that the second data packet is expired.

3. The method according to claim 1, wherein the determining that the second data packet is expired comprises:

acquiring a delay duration of the second data packet and a time-to-live of the second data packet; and in response to determining that the delay duration of the second data packet is greater than the time-to-live of the second data packet, determining that the second data packet is expired.

4. The method according to claim 3, wherein the acquiring the delay duration of the second data packet comprises:

acquiring a delay duration of the first data packet;

acquiring a sending time interval between sending time that the sending terminal sends the first data packet and sending time that the sending terminal sends the second data packet; and acquiring the delay duration of the second data packet according to the delay duration of the first data packet and the sending time interval.

5. The method according to claim 4, wherein the acquiring the delay duration of the first data packet comprises:

acquiring current time of the receiving terminal;

acquiring receiving time that the receiving terminal receives the first data packet;

acquiring a transmission duration spent on transmitting the first data packet from the sending terminal to the receiving terminal; and acquiring the delay duration of the first data packet according to the current time, the receiving time, and the transmission duration.

6. The method according to claim 3, wherein the acquiring the time-to-live of the second data packet comprises:

acquiring the time-to-live of the second data packet according to the consumption importance level of the second data packet.

7. The method according to claim 6, wherein the acquiring the time-to-live of the second data packet according to the consumption importance level of the second data packet comprises:

searching for a time-to-live corresponding to the consumption importance level of the second data packet in a correspondence relationship between consumption importance levels and time-to-live.

8. The method according to claim 7, wherein:

in the correspondence relationship, the higher the consumption importance level is, the longer the time-to-live is, and the lower the consumption importance level is, the lower the time-to-live is.

9. A device comprising:

one or more processors; and one or more memories storing thereon computer-readable instructions that, when executed by the one or more processors, cause the one or more processors to perform acts comprising:

in response to determining to send to a receiving terminal a plurality of data packets continuously at an interval in a preset sending sequence, for a respective data packet in the plurality of data packets, setting, in a specific field of the respective data packet, at least an identifier for indicating a consumption importance level of a data packet preceding the respective data packet sent in the preset sending sequence;

setting a time interval in a preset field of the respective data packet, the time interval including a time interval between a sending time that the respective data packet is sent and a sending time that the data packet preceding the respective data packet in the preset sending sequence is sent; and sending to a receiving terminal the plurality of data packets continuously at an interval according to the preset sending sequence and time intervals set in the plurality of data packets.

10. The device according to claim 9, wherein the acts further comprise:

acquiring a consumption importance level of the respective data packet.

11. The device according to claim 10, wherein the acts further comprise:

acquiring a coding redundancy corresponding to the consumption importance level of the respective data packet;

coding the plurality of data packets based on their coding redundancies to obtain a redundant data packet corresponding to the respective data packet; and sending to the receiving terminal the redundant data packet.

12. The device according to claim 11, wherein a first coding redundancy corresponding to a first consumption importance level, which is higher than a second consumption importance level, is higher than a second coding redundancy corresponding to a second consumption importance level.

13. One or more memories storing thereon computer-readable instructions that, when executed by one or more processors, cause the one or more processors to perform acts comprising:

determining to send to a receiving terminal a plurality of data packets continuously at an interval in a preset sending sequence, a respective data packet including a respective consumption importance level of the respective data packet and another consumption importance level of another data packet preceding the respective data packet in the plurality of data packets in the preset sending sequence;

for the respective data packet in the plurality of data packets, acquiring the respective consumption importance level of the respective data packet;

acquiring a time-to-live corresponding to the respective consumption importance level of the respective data packet;

determining that a time-to-live corresponding to the respective consumption importance level is not sent to the receiving terminal; and sending to the receiving terminal the respective consumption importance level and the time-to-live corresponding to the respective consumption importance level.

14. The one or more memories according to claim 13, wherein a time-to-live corresponding to a higher consumption importance level is greater than that corresponding to a lower consumption importance level.

15. The one or more memories according to claim 13, wherein the acts further comprise:

for the respective data packet in the plurality of data packets, setting, in a specific field of the respective data packet, at least an identifier for indicating a consumption importance level of a data packet preceding the respective data packet sent in the preset sending sequence.

16. The one or more memories according to claim 15, wherein the acts further comprise:

setting a time interval in a preset field of the respective data packet, the time interval including a time interval between a sending time that the respective data packet is sent and a sending time that the data packet preceding the respective data packet in the preset sending sequence is sent.

17. The one or more memories according to claim 16, wherein the acts further comprise:

sending to the receiving terminal the plurality of data packets continuously at an interval according to the preset sending sequence and time intervals set in the plurality of data packets.

18. The one or more memories according to claim 13, wherein the acts further comprise:

acquiring a coding redundancy corresponding to the respective consumption importance level of the respective data packet.

19. The one or more memories according to claim 18, wherein the acts further comprise:

coding the plurality of data packets based on their coding redundancies to obtain a redundant data packet corresponding to the respective data packet; and sending to the receiving terminal the redundant data packet.

20. The one or more memories according to claim 19, wherein a first coding redundancy corresponding to a first consumption importance level, which is higher than a second consumption importance level, is higher than a second coding redundancy corresponding to a second consumption importance level.

* * * * *